(12) United States Patent
Wang

(10) Patent No.: US 10,266,125 B2
(45) Date of Patent: Apr. 23, 2019

(54) CAMERA DEVICE

(71) Applicant: Yuhua Wang, Beijing (CN)

(72) Inventor: Yuhua Wang, Beijing (CN)

( * ) Notice: Subject to any disclaimer, the term of this patent is extended or adjusted under 35 U.S.C. 154(b) by 193 days.

(21) Appl. No.: 15/351,051

(22) Filed: Nov. 14, 2016

(65) Prior Publication Data

US 2017/0057423 A1    Mar. 2, 2017

Related U.S. Application Data

(63) Continuation of application No. PCT/CN2015/078744, filed on May 12, 2015, which
(Continued)

(30) Foreign Application Priority Data

May 13, 2014 (CN) .................. 2014 2 0244088 U
Jan. 4, 2015 (CN) .................. 2015 2 0001778 U
Jan. 20, 2016 (CN) .................. 2016 2 0050041 U

(51) Int. Cl.
*B60R 11/04*      (2006.01)
*H04N 5/232*      (2006.01)
(Continued)

(52) U.S. Cl.
CPC .............. *B60R 11/04* (2013.01); *B60R 1/00* (2013.01); *H04N 5/2252* (2013.01);
(Continued)

(58) Field of Classification Search
CPC ... B60R 11/04; B60R 1/00; B60R 2011/0057; H04N 5/2252; H04N 5/2254; H04N 5/2256; H04N 5/23241
(Continued)

(56) References Cited

U.S. PATENT DOCUMENTS 3,586,501 A * 6/1971 Norquist et al. ....... G03B 17/34
                                                    396/32
5,909,891 A * 6/1999 Swart ..................... B60D 1/065
                                                    280/422
(Continued)

FOREIGN PATENT DOCUMENTS

CN    200720120192.5    5/2007
CN    200820107231.2    4/2008
(Continued)

OTHER PUBLICATIONS

International Search Report dated Aug. 14, 2015, for corresponding Patent Application No. PCT/CN2015/078744.
(Continued)

*Primary Examiner* — Zaihan Jiang
(74) *Attorney, Agent, or Firm* — Renner, Otto, Boisselle & Sklar, LLP

(57) ABSTRACT

A camera device comprises: a camera section which includes a camera base and a camera case disposed on the camera base and housing a pickup lens therein; and an attaching device which includes a magnetic attraction box and a fixing device formed integrally with the magnetic attraction box and fixable to an automobile, wherein one of a front surface of the magnetic attraction box and a back surface of the camera base is provided with a magnet capable of attracting an iron family metal and the other of the front surface and the back surface has properties of an iron family metal attractable by the magnet, and the fixing device is a fixing device having a grooved rail, double bar drag hooks and a spring, the magnetic attraction box being formed integrally with the grooved rail.

18 Claims, 18 Drawing Sheets

Related U.S. Application Data is a continuation of application No. PCT/CN2016/070030, filed on Jan. 4, 2016, which is a continuation of application No. PCT/CN2016/077997, filed on Mar. 31, 2016.

(51) Int. Cl.
*B60R 1/00* (2006.01)
*H04N 5/225* (2006.01)
*B60R 11/00* (2006.01)

(52) U.S. Cl.
CPC ......... *H04N 5/2254* (2013.01); *H04N 5/2256* (2013.01); *B60R 2011/0057* (2013.01); *B60R 2300/101* (2013.01); *B60R 2300/40* (2013.01)

(58) Field of Classification Search
USPC ....................................................... 348/148
See application file for complete search history.

(56) References Cited

U.S. PATENT DOCUMENTS

| | | | |
|---|---|---|---|
| 7,418,346 B2 * | 8/2008 | Breed ................. | B60N 2/2863 701/117 |
| 2003/0169336 A1 * | 9/2003 | Ra ........................... | B60R 1/00 348/148 |
| 2003/0169522 A1 | 9/2003 | Schofield et al. | |
| 2004/0032321 A1 * | 2/2004 | McMahon ............ | B60Q 9/005 340/425.5 |
| 2005/0275512 A1 * | 12/2005 | Shimoyama .......... | B60Q 9/005 340/435 |
| 2007/0236364 A1 * | 10/2007 | Hubbard ............... | B60Q 9/005 340/932.2 |
| 2009/0174535 A1 * | 7/2009 | Tang ...................... | B60R 11/04 340/435 |
| 2010/0263948 A1 * | 10/2010 | Couture ................. | B25J 5/005 180/8.2 |
| 2012/0162428 A1 * | 6/2012 | Wee ..................... | B60R 1/0602 348/148 |
| 2014/0191096 A1 | 7/2014 | Wiercinski et al. | |
| 2014/0354815 A1 * | 12/2014 | Hughes ................ | G08G 1/163 348/148 |
| 2016/0001713 A1 | 1/2016 | Wang | |

FOREIGN PATENT DOCUMENTS

| | | |
|---|---|---|
| CN | 201506296 U | 6/2010 |
| CN | 202093584 U | 12/2011 |
| CN | 202896422 U | 4/2013 |
| CN | 203039786 U | 7/2013 |
| CN | 103507711 A | 1/2014 |
| CN | 203511474 U | 4/2014 |
| CN | 203832348 U | 9/2014 |
| CN | 104080653 A | 10/2014 |
| CN | 204350133 U | 5/2015 |
| CN | 104994257 A | 10/2015 |
| CN | 205468863 U | 8/2016 |
| EP | 2711245 A2 | 3/2014 |
| KR | 100913643 B1 | 8/2009 |
| WO | WO 2006063827 * | 12/2004 |
| WO | WO2006063827 A1 * | 12/2005 |
| WO | 2014/107256 A1 | 7/2014 |
| WO | 2014/114227 A1 | 7/2014 |
| WO | 2017/124639 A1 | 7/2017 |

OTHER PUBLICATIONS

International Search Report dated Apr. 8, 2016, for corresponding Patent Application No. PCT/CN2016/070030.
International Search Report dated Mar. 20, 2014, for corresponding Patent Application No. PCT/US2013/073133.
International Search Report dated Apr. 18, 2014, for corresponding Patent Application No. PCT/CN2014/071069.
International Preliminary Report on Patentability dated Nov. 15, 2016, for corresponding Patent Application No. PCT/CN2015/078744.
International Preliminary Report on Patentability dated Jul. 4, 2017, for corresponding Patent Application No. PCT/CN2016/070030.
International Search Report dated Oct. 26, 2016, for corresponding Patent Application No. PCT/CN2016/077997.
International Preliminary Report on Patentability dated Jul. 24, 2018, for corresponding Patent Application No. PCT/CN2016/077997.

* cited by examiner

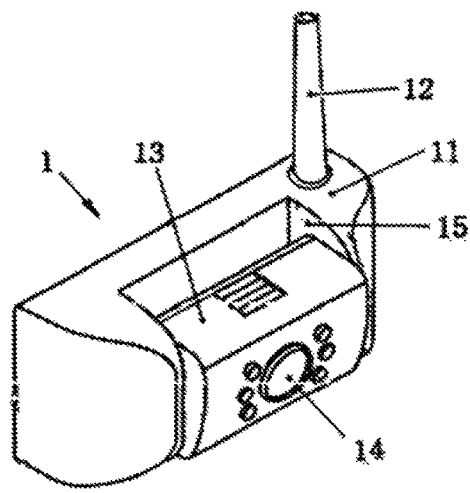
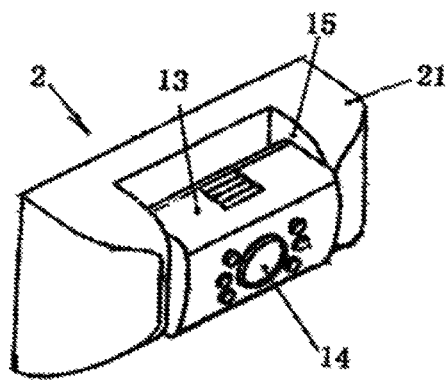
Fig. 1  Fig. 2
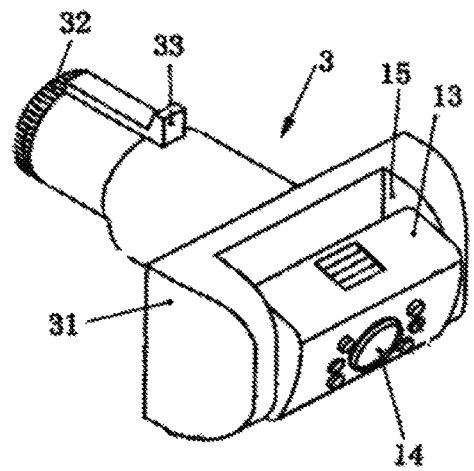
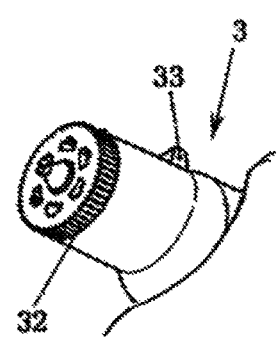
Fig. 3  Fig. 4
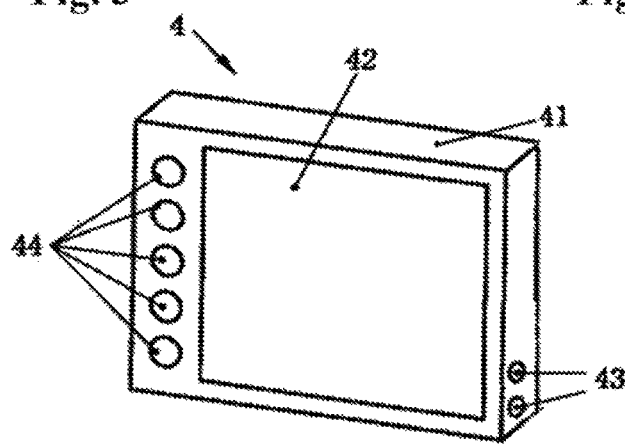
Fig. 5

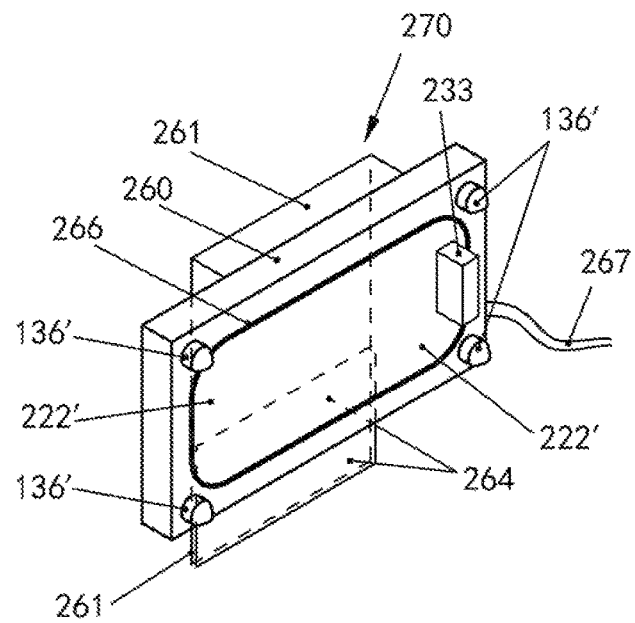
Fig.28
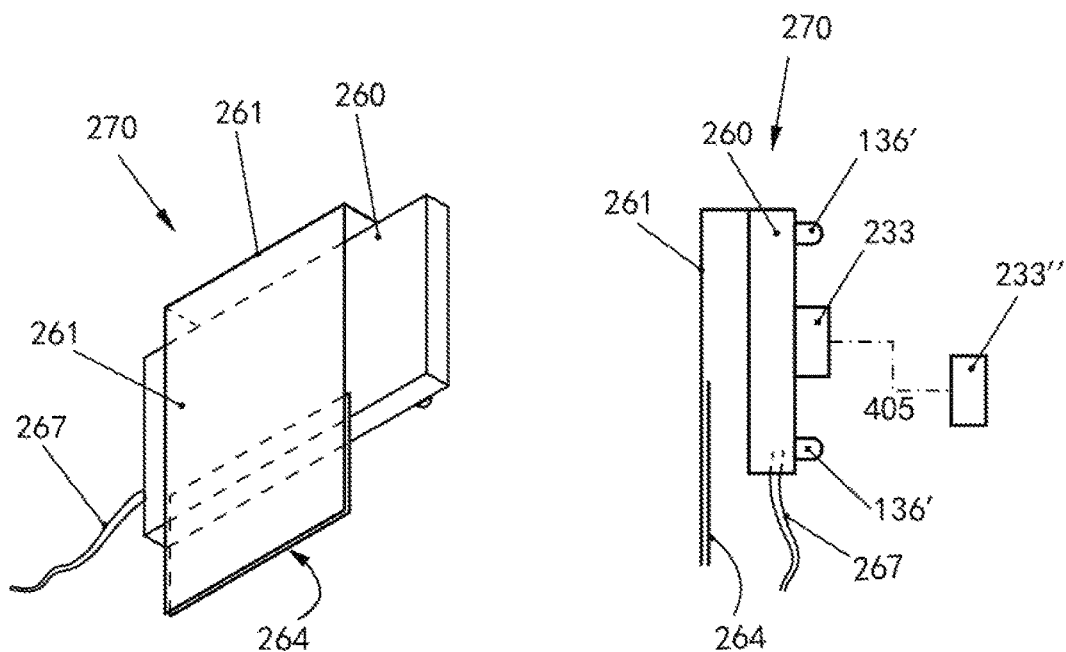
Fig.29
Fig.30

CAMERA DEVICE

This application is a continuation of International Application No. PCT/CN2015/078744, filed May 12, 2015; PCT/CN2016/070030, filed Jan. 4, 2016; and PCT/CN2016/077997, filed Mar. 31, 2016; each of which is hereby incorporated by reference.

FIELD OF THE INVENTION

The present invention relates to a camera device used in an automobile.

BACKGROUND OF THE INVENTION

The present applicant has owned Chinese patents ZL200920160553.8 and ZL201320036202.2. These patents have disclosed such a combined apparatus that includes a camera device attached externally of a tail portion of an automobile and facing rearward of the automobile, a display screen device displaying an image picked up by the camera device, and a component bringing the camera device and the display screen device into electrical signal communication.

SUMMARY OF THE INVENTION

The present invention involves three implementations of A, B, and C, wherein the implementation A contains embodiments A-1 and A-2, and the implementation B contains embodiments B-1 and B-2.

The present invention provides a combined apparatus of camera and display screen comprising a camera device and a display screen device which are provided inside an automobile and an electrical connection plug supplying a direct current (DC) power of 12 V to the combined apparatus from within the automobile, wherein an image signal picked up by the camera device is transmitted to the display screen device, and the display screen device is provided with an image signal processing device and a display screen displaying an image.

The embodiment A-1 of the implementation A of the present invention provides a combined apparatus of camera and display screen comprising a display screen device provided inside an automobile, a camera device provided outside the automobile, and an electrical connection plug supplying a direct current (DC) power of 12 V to the combined apparatus from within the automobile, wherein an image signal picked up by the camera device is transmitted to the display screen device, the display screen device is provided with an image signal processing device and a display screen displaying an image, the camera device provided outside the automobile is provided with a device transmitting the image signal to the display screen device in a wireless manner, and the display screen device is provided with a device receiving and processing the image signal in a wireless form and displaying the image.

The camera device provided inside the automobile is fixed to vertical shafts of a headrest of a seat in the automobile by a fixing device having a grooved rail and double bar drag hooks.

The fixing device having the grooved rail and the double bar drag hooks further has a slidable bottom plate capable of moving the camera device.

The image signal picked up by the camera device provided inside the automobile is transmitted to the display screen device via a signal wire.

The camera device provided inside the automobile is provided with a device transmitting the image signal picked up by the camera device to the display screen device in a wireless manner.

The number of the camera device provided outside the automobile is two or more.

The number of the camera device provided outside the automobile is two, the two camera devices are provided outside a tail portion of a tractor and outside a tail portion of a trailer respectively, and both of the camera devices face rearward of the automobile.

The camera device provided outside the automobile has a battery bin supplying power for itself, the camera device is provided with a magnet therein, and an attraction force of the magnet is used to fix the camera device outside the automobile.

The camera device provided outside the automobile has an electrical plug to be inserted into a power supply socket outside the automobile, the camera device is connected to the power supply socket via the electrical plug, and the camera device is fixed by a locking device.

The camera device provided inside the automobile has a cabinet provided with slots to be passed through by a binding tape and attached with a binding tape locking device.

The embodiment B-1 of the implementation B of the present invention provides a camera device comprising a camera base, a camera case disposed on the camera base and housing a pickup lens therein, and a power supply connector to be connected to a power supply socket outside a tail portion of an automobile, wherein a wireless transmitter which transmits an image signal picked up by the pickup lens to a receiver within the automobile in a wireless manner is provided in the camera base, a magnet capable of attracting an iron family metal is provided in a back portion of the camera base, an electrical plug matchable with the power supply socket outside the tail portion of the automobile is provided on a rear end of the power supply connector, and an attachment surface matchable with the back portion of the camera base is provided on a front end of the power supply connector, the attachment surface having properties of an iron family metal attractable by the magnet.

A U-shaped space is formed in the camera base, a distance between two arms forming the U-shaped space of the camera base is approximately equal to a length of the camera case so that the camera case is exactly held in the U-shaped space, pivot-bearing structures by which the camera case is rotated with respect to the camera base by an elevation angle or a depression angle are respectively provided at locations where both ends of the camera case are in contact with the two arms of the camera base and held by them, each of the pivot-bearing structures having an elevation angle of 30°~60° and a depression angle of 15°~30° as a rotatable angle, and rotational position fixing devices in a form of bead and cavity are provided in two adjacent surfaces rotated relatively to each other, each of the rotational position fixing devices having 4~12 fixable positions.

At least two positioning recesses are provided in a surface of the back portion of the camera base, and positioning projections the number of which is equal to that of the positioning recesses are provided at positions corresponding to the positioning recesses on the attachment surface of the power supply connector.

A plug-socket device for electricity introduction is provided at corresponding positions in the back portion of the camera base and on the front end of the power supply connector, and a socket of the plug-socket device is provided on the side of the camera base.

The socket provided on the side of the camera base is also connectable to a power supply including an internal power supply of the automobile.

A clip matchable with a spring cover of the power supply socket outside the tail portion of the automobile is provided on the power supply connector.

A pivot-bearing structure by which the front end or the rear end of the power supply connector is rotated around a concentric longitudinal axis of the power supply connector by a left inclination angle or a right inclination angle is provided between the front end and the rear end.

The pivot-bearing structure of the power supply connector has a rotatable angle of about 360°, a rotational position fixing device in a form of bead and cavity is provided in two adjacent surfaces rotated relatively to each other, and the rotational position fixing device has 12~24 fixable positions.

A battery bin for supplying power is further provided in the camera base, and a rechargeable battery is disposed in the battery bin.

2~12 semiconductor auxiliary light sources are provided around the pickup lens in the camera case.

A pair of ultrasonic range-sensing alarming probes are provided on the camera base and located on both sides of the camera case.

Slots to be passed through by a binding tape are provided on left and right ends of the back portion of the camera base.

The implementation C of the present invention provides a camera device comprising: a camera section which includes a camera base and a camera case disposed on the camera base and housing a pickup lens therein; and an attaching device which includes a magnetic attraction box and a fixing device formed integrally with the magnetic attraction box and fixable to an automobile, wherein a wireless transmitter which transmits an image signal picked up by the pickup lens to a receiver within the automobile in a wireless manner is provided in the camera base, a front surface of the magnetic attraction box is an attachment surface attachable to and matchable with a back surface of the camera base, one of the front surface and the back surface is provided with a magnet capable of attracting an iron family metal and the other of the front surface and the back surface has properties of an iron family metal attractable by the magnet, at least two positioning recesses are provided in the one of the front surface and the back surface and positioning projections matchable with the positioning recesses the number of which is equal to that of the positioning recesses are provided on the other of the front surface and the back surface, electricity is introduced by the magnetic attraction box from an electrical system of the automobile into the camera base through a plug-socket device to supply power for image picking up and signal transmission, and wherein the fixing device formed integrally with the magnetic attraction box and fixable to the automobile is a clamp plate fastened and fixed to a license plate outside a tail portion of the automobile.

The back surface of the camera base is provided with a magnet capable of attracting an iron family metal and the front surface of the magnetic attraction box has properties of an iron family metal attractable by the magnet, at least two positioning recesses are provided in the back surface of the camera base and positioning projections matchable with the positioning recesses the number of which is equal to that of the positioning recesses are provided on the front surface of the magnetic attraction box, electricity from the electrical system of the automobile is introduced by the magnetic attraction box into a socket in the back surface of the camera base from a plug on the front surface of the magnetic attraction box through the plug-socket device to supply power for image picking up and signal transmission.

The camera base, the camera case, and the magnetic attraction box are made to be water proof, air tight, and moisture resistant.

A soft rubber waterproof seal ring is provided for one or both of the front surface of the magnetic attraction box and the back surface of the camera base, and a soft rubber waterproof cap is provided for a plug on the front surface of the magnetic attraction box.

A U-shaped space is formed in the camera base, a distance between two arms of the camera base is approximately equal to a length of the camera case so that the camera case is exactly held in the U-shaped space, pivot-bearing structures by which the camera case is rotated with respect to the camera base by an elevation angle or a depression angle are respectively provided at locations where both ends of the camera case are in contact with the two arms of the camera base and held by them, each of the pivot-bearing structures having an elevation angle of 30°~60° and a depression angle of 15°~30° as a rotatable angle, and rotational position fixing devices in a form of bead and cavity are provided in two adjacent surfaces rotated relatively to each other, each of the rotational position fixing devices having 4~12 fixable positions.

A battery bin for supplying power in which a battery is disposed is further provided in the camera base.

2~12 semiconductor auxiliary light sources are provided around the pickup lens in the camera case.

A pair of ultrasonic range-sensing alarming probes are provided on the camera base and located on both sides of the camera case.

Slots to be passed through by a binding tape are provided on left and right ends of a back portion of the camera base.

A double-faced adhesive strip is adhered to the clamp plate to enhance clamping firmness.

The embodiment B-2 of the implementation B of the present invention provides a camera device comprising: a camera section which includes a camera base and a camera case disposed on the camera base and housing a pickup lens therein; and an attaching device which includes a magnetic attraction box and a fixing device formed integrally with the magnetic attraction box and fixable to an automobile, wherein a wireless transmitter which transmits an image signal picked up by the pickup lens to a receiver within the automobile in a wireless manner is provided in the camera base, a front surface of the magnetic attraction box is an attachment surface attachable to and matchable with a back surface of the camera base, one of the front surface and the back surface is provided with a magnet capable of attracting an iron family metal and the other of the front surface and the back surface has properties of an iron family metal attractable by the magnet, at least two positioning recesses are provided in the one of the front surface and the back surface and positioning projections matchable with the positioning recesses the number of which is equal to that of the positioning recesses are provided on the other of the front surface and the back surface, electricity is introduced by the magnetic attraction box from an electrical system of the automobile into the camera base through a plug-socket device to supply power for image picking up and signal transmission, and wherein the fixing device formed integrally with the magnetic attraction box and fixable to the automobile is a power supply connector, one end of the power supply connector is formed integrally with the magnetic attraction box by being connected to a back surface of the magnetic attraction box, the other end of the power supply connector is an electrical plug matchable with a power supply socket outside a tail portion of the automobile.

The back surface of the camera base is provided with a magnet capable of attracting an iron family metal and the front surface of the magnetic attraction box has properties of an iron family metal attractable by the magnet, at least two positioning recesses are provided in the back surface of the camera base and positioning projections matchable with the positioning recesses the number of which is equal to that of the positioning recesses are provided on the front surface of the magnetic attraction box, electricity from the electrical system of the automobile is introduced by the magnetic attraction box into a socket in the back surface of the camera base from a plug on the front surface of the magnetic attraction box through the plug-socket device to supply power for image picking up and signal transmission, and a clip matchable with a spring cover of the power supply socket outside the tail portion of the automobile is provided on the power supply connector, a pivot-bearing structure by which either end of the power supply connector is rotated around a concentric longitudinal axis of the power supply connector by a left inclination angle or a right inclination angle is provided between both ends of the power supply connector, the pivot-bearing structure of the power supply connector having a rotatable angle of about 360°, and a rotational position fixing device in a form of bead and cavity is provided in two adjacent surfaces rotated relatively to each other, the rotational position fixing device having 12~24 fixable positions.

The camera base, the camera case, the magnetic attraction box, and the power supply connector are made to be water proof, air tight, and moisture resistant.

A soft rubber waterproof seal ring is provided for one or both of the front surface of the magnetic attraction box and the back surface of the camera base, and a soft rubber waterproof cap is provided for a plug on the front surface of the magnetic attraction box.

A U-shaped space is formed in the camera base, a distance between two arms of the camera base is approximately equal to a length of the camera case so that the camera case is exactly held in the U-shaped space, pivot-bearing structures by which the camera case is rotated with respect to the camera base by an elevation angle or a depression angle are respectively provided at locations where both ends of the camera case are in contact with the two arms of the camera base and held by them, each of the pivot-bearing structures having an elevation angle of 30°~60° and a depression angle of 15°~30° as a rotatable angle, and rotational position fixing devices in a form of bead and cavity are provided in two adjacent surfaces rotated relatively to each other, each of the rotational position fixing devices having 4~12 fixable positions.

A battery bin for supplying power in which a battery is disposed is further provided in the camera base.

2~12 semiconductor auxiliary light sources are provided around the pickup lens in the camera case.

A pair of ultrasonic range-sensing alarming probes are provided on the camera base and located on both sides of the camera case.

Slots to be passed through by a binding tape are provided on left and right ends of a back portion of the camera base.

The embodiment A-2 of the implementation A of the present invention provides a camera device comprising: a camera section which includes a camera base and a camera case disposed on the camera base and housing a pickup lens therein; and an attaching device which includes a magnetic attraction box and a fixing device formed integrally with the magnetic attraction box and fixable to an automobile, wherein a wireless transmitter which transmits an image signal picked up by the pickup lens to a receiver within the automobile in a wireless manner is provided in the camera base, a front surface of the magnetic attraction box is an attachment surface attachable to and matchable with a back surface of the camera base, one of the front surface and the back surface is provided with a magnet capable of attracting an iron family metal and the other of the front surface and the back surface has properties of an iron family metal attractable by the magnet, at least two positioning recesses are provided in the one of the front surface and the back surface and positioning projections matchable with the positioning recesses the number of which is equal to that of the positioning recesses are provided on the other of the front surface and the back surface, electricity is introduced by the magnetic attraction box from an electrical system of the automobile into the camera base through a plug-socket device to supply power for image picking up and signal transmission, and wherein the fixing device formed integrally with the magnetic attraction box and fixable to the automobile is a fixing device having a grooved rail, double bar drag hooks and a spring, the magnetic attraction box is formed integrally with the grooved rail, and the fixing device is fixable to vertical shafts of a headrest of a seat in the automobile.

The back surface of the camera base is provided with a magnet capable of attracting an iron family metal and the front surface of the magnetic attraction box has properties of an iron family metal attractable by the magnet, at least two positioning recesses are provided in the back surface of the camera base and positioning projections matchable with the positioning recesses the number of which is equal to that of the positioning recesses are provided on the front surface of the magnetic attraction box, electricity from the electrical system of the automobile is introduced by the magnetic attraction box into a socket in the back surface of the camera base from a plug on the front surface of the magnetic attraction box through the plug-socket device to supply power for image picking up and signal transmission.

The fixing device having the grooved rail, the double bar drag hooks and the spring further has a slidable bottom plate capable of moving the magnetic attraction box, the magnetic attraction box is formed integrally with the bottom plate, and the fixing device is fixable to the vertical shafts of the headrest of the seat in the automobile.

A U-shaped space is formed in the camera base, a distance between two arms of the camera base is approximately equal to a length of the camera case so that the camera case is exactly held in the U-shaped space, pivot-bearing structures by which the camera case is rotated with respect to the camera base by an elevation angle or a depression angle are respectively provided at locations where both ends of the camera case are in contact with the two arms of the camera base and held by them, each of the pivot-bearing structures having an elevation angle of 30°~60° and a depression angle of 15°~30° as a rotatable angle, and rotational position fixing devices in a form of bead and cavity are provided in two adjacent surfaces rotated relatively to each other, each of the rotational position fixing devices having 4~12 fixable positions.

Slots to be passed through by a binding tape are provided on left and right ends of a back portion of the camera base.

BRIEF DESCRIPTION OF THE DRAWINGS

FIGS. 1-6 are illustrations of a camera device and a display screen device involved in a combined apparatus of camera and display screen according to the present invention.

FIGS. 13-23 illustrate an embodiment B-1 of the present invention, wherein:

FIGS. 13 and 14 are a front view and a side view of the camera device according to the embodiment B-1 of the present invention respectively;

FIGS. 15 and 16 are perspective views in a depression direction and an elevation direction of the camera device according to the embodiment B-1 respectively;

FIGS. 17-19 are a perspective view, a bottom view, and a rear view in the depression direction of a camera base of the camera device according to the embodiment B-1 respectively;

FIG. 20 is a schematic diagram of the camera base and a power supply connector joined or separated of the camera device according to the embodiment B-1;

FIGS. 21 and 22 are schematic diagrams of two kinds of plug-socket devices according to the embodiment B-1 by which the camera base and the power supply connector are electrically communicable with each other;

FIG. 23 is a schematic diagram of a rotational position fixing device in a form of bead and cavity.

FIGS. 28-32 are isolated and assembled schematic diagrams of the camera section and an attaching device according to an implementation C of the present invention.

DETAILED DESCRIPTION OF THE PREFERRED EMBODIMENTS

Figure 6:
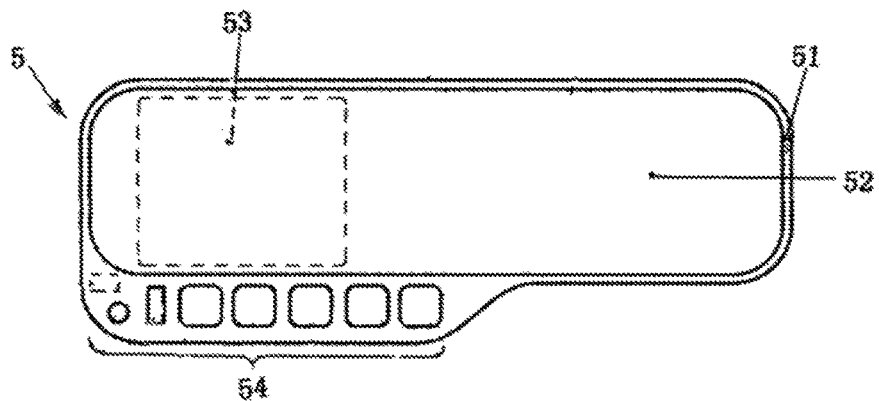

In the present invention, when referred to, orientations such as a front direction, a rear direction, a left direction, a right direction, an up direction, a down direction, an elevation angle, a depression angle, and inclination angles are based on a direction toward which a front surface of a camera picks up an image.

As shown in FIG. 1, a camera device 1 includes a base 11, an antenna 12 transmitting a picked up image signal, a camera case 13, and a pickup lens 14. A numeral reference 15 denotes a gap formed between the camera case 13 and the base 11, and a rotating mechanism for changing an elevation angle or a depression angle of the camera may be installed in the gap 15.

FIG. 2 shows another camera device 2. The camera device 2 includes a base 21 but has not the antenna 12.

FIG. 3 shows further another camera device 3. The camera device 3 includes a base 31 but has a built-in antenna in the base 31 instead of the antenna 12 extending out of a cabinet of the camera device 3. A protruding electrical plug 32 to be inserted into a power supply socket outside a tail portion of an automobile is provided at the back of the base 31, and a reference numeral 33 indicates a clip used to fix the electrical plug 32.

FIG. 4 shows the other side of the protruding electrical plug 32 in FIG. 3.

As shown in FIG. 5, a display screen device 4 includes a frame 41, a display screen 42, sockets (a power supply socket and an external socket) 43, and a number of control buttons 44.

FIG. 6 shows another display screen device 5 in which a display screen 53 is provided at the back of a mirror glass 52 in a rear view mirror case 51 of the automobile. The display screen device 5 includes a number of control buttons 54.

Figure 7:
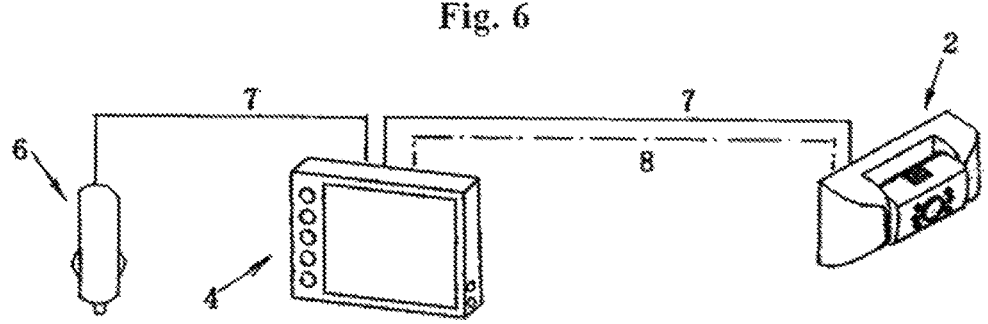
FIG. 7 is a schematic diagram showing a first form of the combined apparatus of camera and display screen according to the present invention.

FIG. 7 shows a first form of a combined apparatus of camera and display screen according to the present invention. The camera device 2 may be located at a desired position in the automobile, for example, it is provided at the back of a front seat in the automobile and faces rearward of the automobile to monitor an infant on a rear seat, or other forms are also possible. The display screen device 4 is located at positions where it is readily visible for a driver in a front portion of the automobile, for example, on an instrument panel, a sunshield board, or a front windshield glass. An electrical plug 6 acquires a (DC) power of 12 V from a cigarette lighter in the automobile. A solid line 7 in FIG. 7 indicates a conducting wire for supplying power to the camera device 2 and the display screen device 4. A dot-dash line 8 in FIG. 7 indicates a signal wire through which the picked up image signal is transmitted to the display screen device 4 by the camera device 2.

Figure 8:
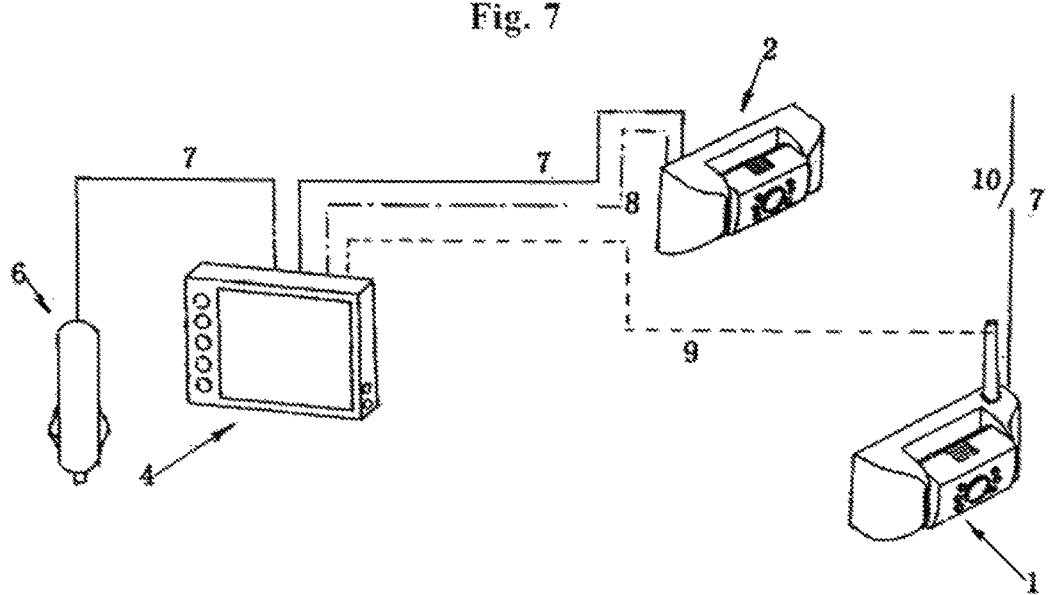
FIG. 8 is a schematic diagram showing a second form of the combined apparatus of camera and display screen according to the present invention.

FIG. 8 shows a second form of the combined apparatus of camera and display screen according to the present invention. In addition to the camera device 2 attached inside the automobile, the camera device 1 is further attached outside the tail portion of the automobile, and the camera device 1 faces rearward of the automobile to monitor a condition behind the automobile in case of reversing or in other cases. The electrical plug 6 acquires a (DC) power of 12 V from the cigarette lighter in the automobile. A broken line 9 in FIG. 8 indicates that the picked up image signal is transmitted to the display screen device 4 in a wireless manner by the antenna of the camera device 1. The camera device 2 within the automobile may not be included in the second form.

The combined apparatus can be operated in a variety of manners one of which is given herein as an example. The combined apparatus is provided with a control device such that the camera device 2 is started simultaneously when the display screen device 4 is power-on and started, the image signal picked up by the camera device 2 is transmitted to the display screen device 4 via the signal wire 8, and then the picked up image is displayed on the display screen of the display screen device 4. In a case where the driver shifts to a reverse gear, the camera device 1 is started immediately after an electric switch 10 in FIG. 8 is closed (turned into an ON state), the image signal picked up by the camera device 1 is transmitted to the display screen device 4 in a wireless manner by the antenna of the camera device 1, and then the image picked up by the camera device 1 (i.e., the condition behind the automobile) is automatically switched to be displayed on the display screen device 4 through a control system of the display screen device 4. When the driver shifts to gears other than the reverse gear, the image picked up by the camera device 2 is automatically restored. Multiple other operating manners are also possible.

Figure 10:
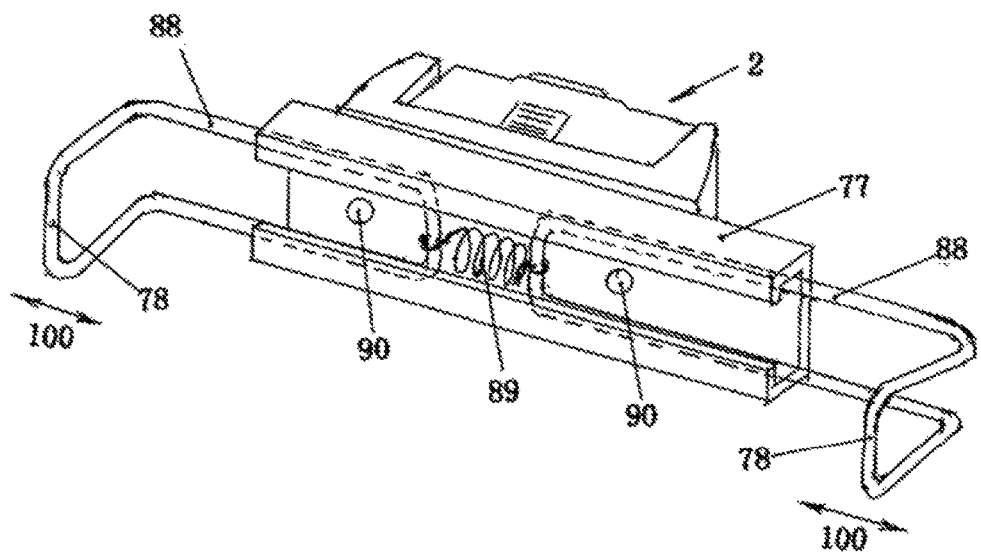
FIG. 10 is a schematic diagram of the camera device attached to a seat in an automobile according to an embodiment A-1 of the present invention.

FIG. 10 is a schematic diagram of the camera device attached to a seat in the automobile according to an embodiment A-1 of an implementation A of the present invention. In FIG. 10, a back portion of the camera device 2 is fixed to a grooved rail 77 with holes 90 by use of bolts. A pair of drag hooks 88 each of which is formed by two bars are provided in a groove of the grooved rail 77 with hooked ends 78 disposed externally of the groove. In the groove, tail ends of the two drag hooks 88 are connected together by a spring 89.

A headrest is provided above a backrest of the seat in the automobile. The headrest is fixed to the backrest of the seat through a pair of vertical shafts. The headrest is slightly lifted up to expose a fraction of the vertical shafts. The pair of drag hooks 88 in FIG. 10 are pulled outward as indicated by a double-headed arrow 100, the two hooked ends 78 are respectively caught by the pair of vertical shafts, and thus the camera device 2 is fixed therein by virtue of a resilient force of the spring 89.

Figure 9:
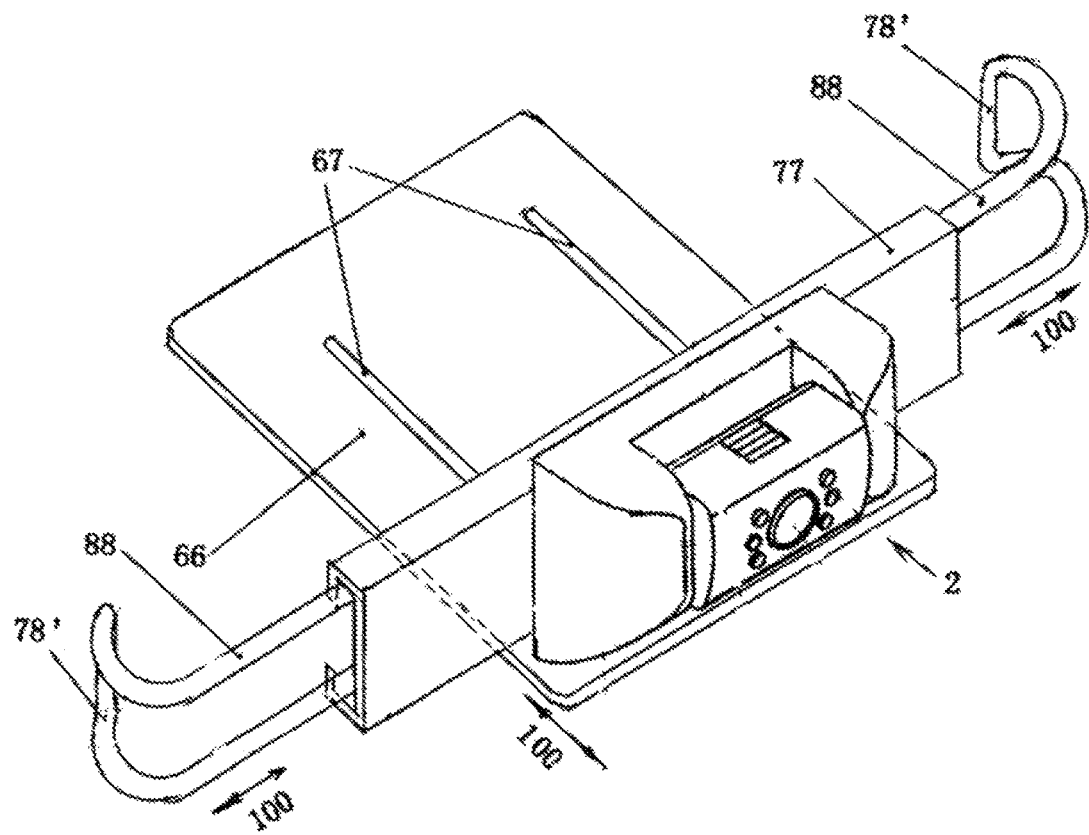
FIGS. 9 and 11 are schematic diagrams of a modified form of the camera device attached to the seat in the automobile according to the embodiment A-1 of the present invention.
Figure 11:
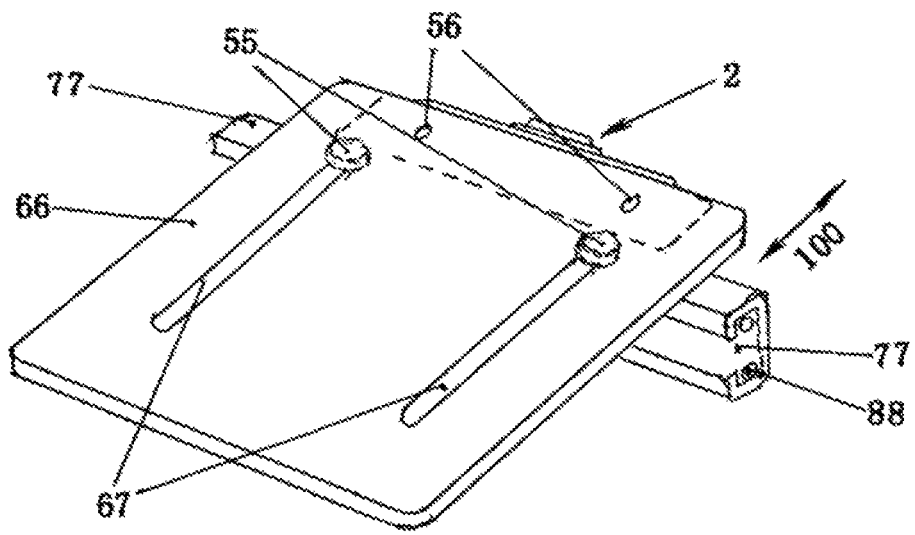

FIGS. 9 and 11 are schematic diagrams of a modified form of the camera device attached to the seat in the automobile according to the embodiment A-1 of the present invention. As seen from FIG. 11, the camera device 2 is fixed to a slidable bottom plate 66 with holes 56 by use of bolts instead of being attached to the grooved rail 77. As seen from FIG. 9, the grooved rail 77 and the drag hooks 88 each formed by two bars used herein are similar to those shown in FIG. 10; the grooved ends 78' and 78 are only different from each other in their shapes, while they are caught by the pair of vertical shafts of the headrest of the seat and have no substantial difference between them. The spring 89 (not shown in FIGS. 9 and 11) is also provided. As seen again from FIG. 11, the slidable bottom plate 66 has two slots 67 parallel to each other therein. The slidable bottom plate 66 is attached to the grooved rail 77 by stud bolts 55. The slidable bottom plate 66 together with the camera device 2 can change or adjust their front-rear positions along a direction indicated by the double-headed arrow 100 to control an appropriate picking up position, which is more adaptable than the embodiment A-1 shown in FIG. 10.

Figure 12:
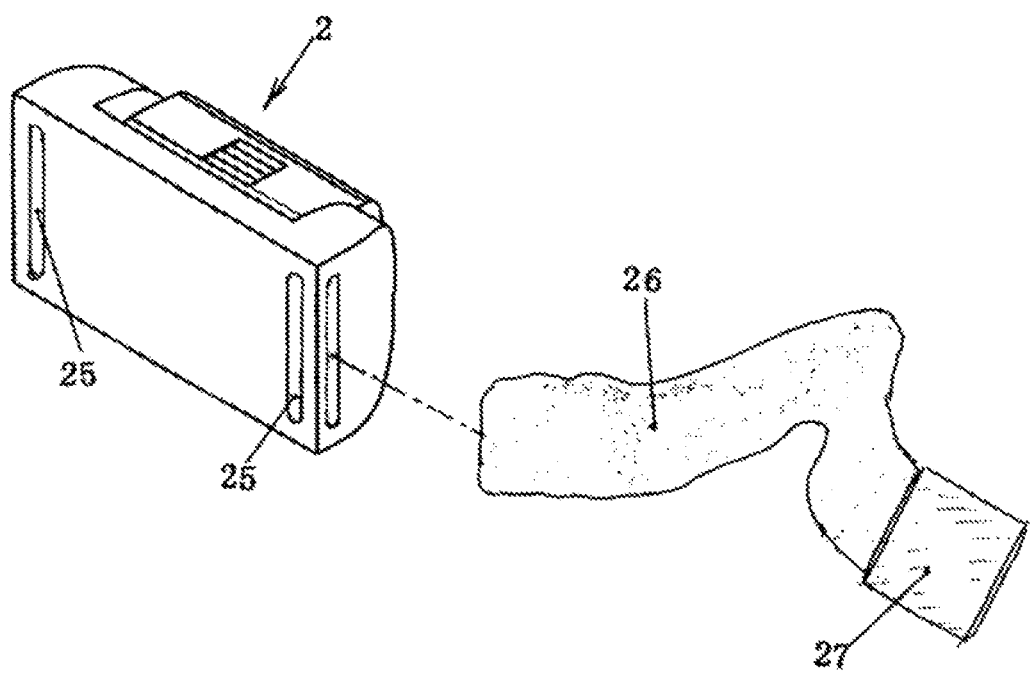
FIG. 12 shows another form of the camera device 2 attached inside the automobile according to the present invention.

FIG. 12 shows another form of the camera device 2 attached inside the automobile according to the present invention. A pair of slots 25 to be passed through by a binding tape are opened on left and right ends of a back portion of the camera base 2, and a set of binding tapes 26 each having a binder 27 may be attached to the camera device 2. In this way, the camera device 2 may be fixed to the vertical shafts of the headrest above the backrest of the seat in the automobile or may be located at other adequate positions in the automobile.

The present invention may be modified into the following alternative forms (not shown in figures).

From FIG. 11, in a case where the slidable bottom plate 66 has only one slot instead of the two parallel slots 67, the camera device 2 is not only movable in a front-rear direction but also inclinable in a left-right direction, which is more adaptable.

The camera device may be mounted inside the automobile in many manners other than being attached to the vertical shafts of the headrest of the seat.

From FIG. 8, the camera device 1 provided outside the automobile may be modified to be replaced by the camera device 3 shown in FIGS. 3 and 4. The protruding electrical plug 32 of the camera device 3 is inserted into the power supply socket outside the tail portion of the automobile, while the camera device 3 is fixed to the automobile through a locking device constituted by the clip 33 and a suitable device on the automobile.

The camera device provided outside the automobile may be modified to have a built-in battery bin in which a rechargeable battery is disposed to supply power for itself without acquiring the (DC) power of 12 V from within the automobile, and the camera device may be modified to be provided with a magnet an attraction force of which is used to fix the camera device to a ferrous metal surface of the automobile.

Two camera devices may be provided outside the automobile, one of which is provided outside a tail portion of a tractor and faces rearward of the tractor to monitor the condition behind the tractor, and the other of which is provided outside a tail portion of a trailer and faces rearward of the trailer to monitor the condition behind the trailer. The number of the camera devices outside the automobile may be larger than two.

The camera device may be provided at other locations (sides, a roof, etc.) outside the automobile to meet particular requirements such as outdoor activities, hunting and the like.

The display screen device may be provided with an appropriate selection control device that enables the display screen to simultaneously display multiple (two or more) images picked up by the camera.

An embodiment B-1 of an implementation B of the present invention will be described below with reference to FIGS. 13-23.

Figure 13:
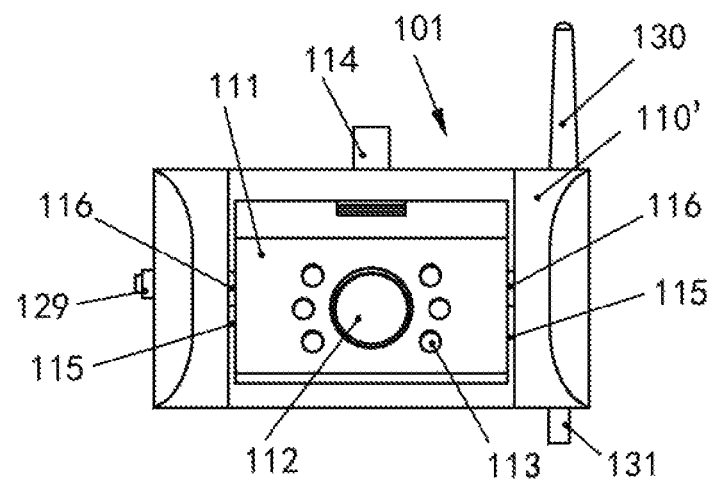

As shown in FIG. 13, a camera device 101 includes a camera base 110' and a camera case 111. The camera case 111 has a pickup lens 112 housed therein and 2~12 (6 in FIG. 13) semiconductor auxiliary light sources 113 provided around the pickup lens 112 in the camera case 111, and the semiconductor auxiliary light sources 113 are used to offer auxiliary illumination for the pickup lens 112 in the dark. The camera base 110' and the camera case 111 are sized such that the camera case 111 is able to be exactly held in a U-shaped space of the camera base 110' with a slight gap 115 left therebetween. Additionally, pivot-bearing devices 116 by which the camera case 111 is rotatable with respect to the camera base 110' by a certain angle (that is, changeable by a depression angle or an elevation angle) in the U-shaped space are respectively provided to the camera base 110' and the camera case 111 so that the pickup lens 112 aims at an object to be picked up. The pivot-bearing devices 116 may have any commonly used structure, each of the pivot-bearing devices 116 having an elevation angle ranging in 30°~60° and a depression angle ranging in 15°~30° as a rotatable angle, and rotational position fixing devices in a form of bead and cavity are provided in two adjacent surfaces rotated relatively to each other, each of the rotational position fixing devices having 4~12 fixable stop positions (refer to FIG. 23).

Figure 14:
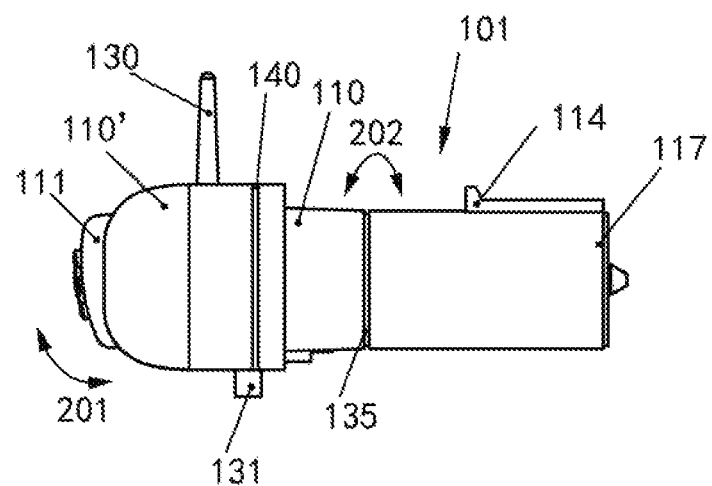

As seen from FIG. 14, a power supply connector 110 is closely attached to a back portion of the camera base 110'. A reference numeral 140 denotes a junction of the camera base 110' and the power supply connector 110 which are joined and fixed by attraction between a magnet in the camera base 110' and a surface having properties of an iron family metal of the power supply connector 110. A tip end of a rear extension portion of the power supply connector 110 is an electrical plug 117 to be connected to a power supply. The electrical plug 117 has a structure matchable with an ordinary power supply socket outside a tail portion of an automobile (for example, a cross country vehicle, a pickup truck, etc.). When the electrical plug 117 is inserted into the power supply socket outside the tail portion of the automobile, the camera device 101 is attached and fixed in an operating position while electricity is being introduced in. The power supply socket outside the tail portion of the automobile usually has a spring cover (not shown in figures), and when the electrical plug 117 is inserted into the power supply socket outside the tail portion of the automobile, the spring cover is firmly fastened on a clip 114 of the power supply connector 110 by virtue of a resilient force of the spring cover so that the camera device 101 does not drop off due to travelling vibration. As a matter of course, the clip 114 should be shaped and positioned to perfectly match with the spring cover. Normally, the electrical plug 117 has one central pin and six pits around the central pin (refer to FIG. 16). Since electrical sockets of different automobiles may need to be inserted at different angles, the rear extension portion of the power supply connector 110 are divided into two segments, and a pivot-bearing device by which these two segments are rotated (or changed) relatively to each other by a left inclination angle or a right inclination angle as indicated by a double-headed arched arrow 202 is provided in a junction 135 of the two segments so that the pickup lens 112 is directed correctly, the pivot-bearing device of the power supply connector 110 having a rotatable angle of about 360°. Meanwhile, a rotational position fixing device in a form of bead and cavity (refer to FIG. 23) is also provided in two adjacent surfaces rotated relatively to each other, and the rotational position fixing device has 12~24 fixable stop positions. A double-headed arched arrow 201 indicates that the camera case 111 is rotated (or changed) with respect to the camera base 110' by an elevation angle or a depression angle using the same rotational position fixing device.

Figure 15:
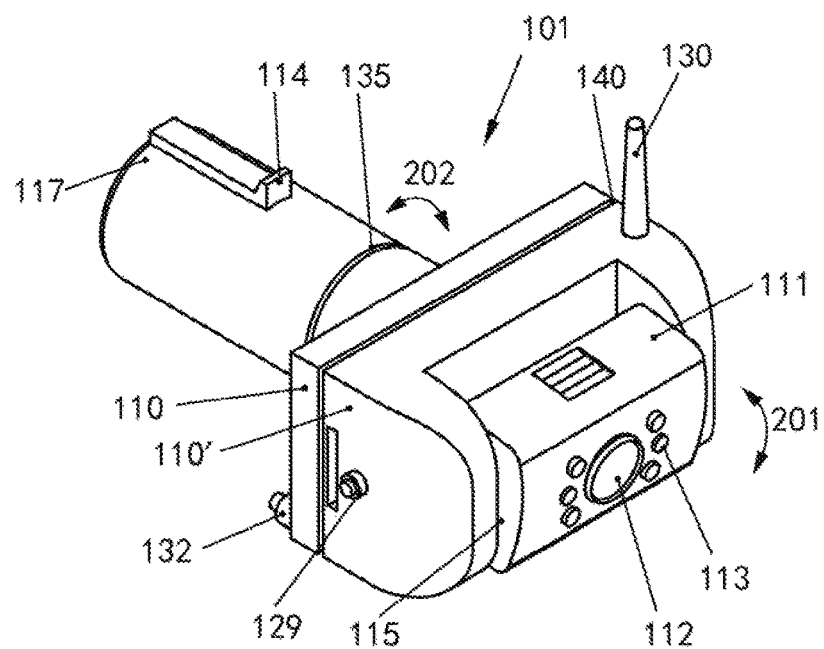
Figure 16:
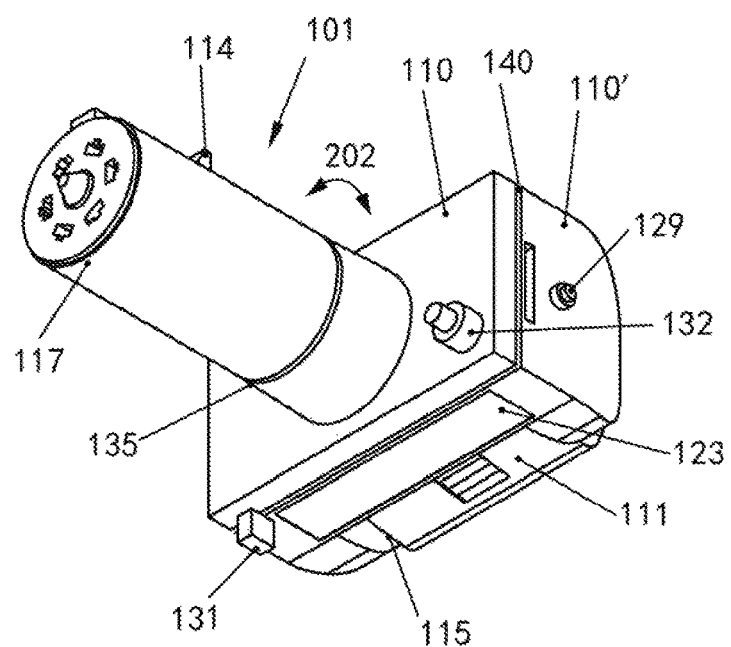
Figure 17:
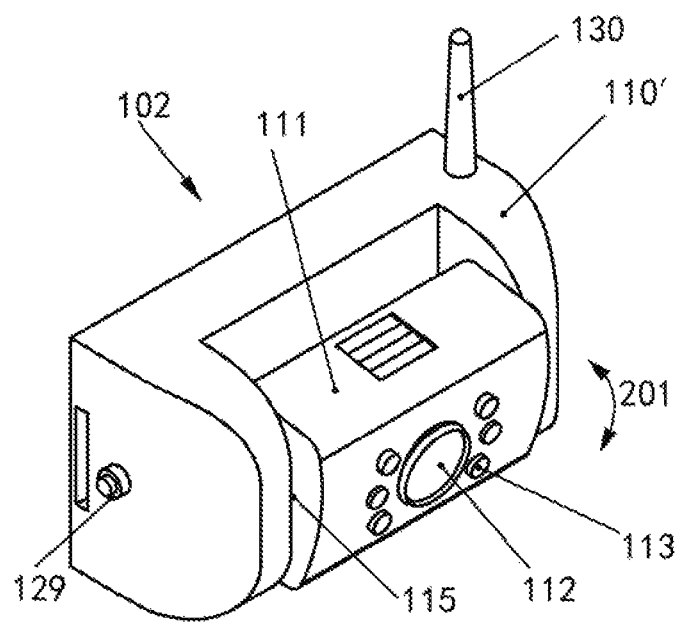

In FIGS. 15 and 16, a reference numeral 130 indicates an antenna, and the antenna 130 is provided on the camera base 110' and transmits an image signal picked up by the pickup lens 112 to a receiver within the automobile in a wireless manner. A reference numeral 129 indicates an electric switch on the camera base 110'. Reference numerals 131 and 132 denote a first kind of power supply connection device (referred to as a first power supply connection device or a first plug-socket device below) and a second kind of power supply connection device (referred to as a second power supply connection device or a second plug-socket device below) respectively, and the power supply connection devices 131 and 132 supply the power acquired by the electrical plug 117 to the camera base 110' across the junction 140. FIGS. 15 and 16 show two kinds of the power supply connection devices 131 and 132, and actually only one kind of them may be selected (other forms are possible, not shown in figures).

As described above, the electrical plug 117 has the one central pin and the six pits around the central pin and matches with the ordinary power supply socket outside the tail portion of the automobile (for example, a cross country vehicle, a pickup truck, etc.).

Figure 18:
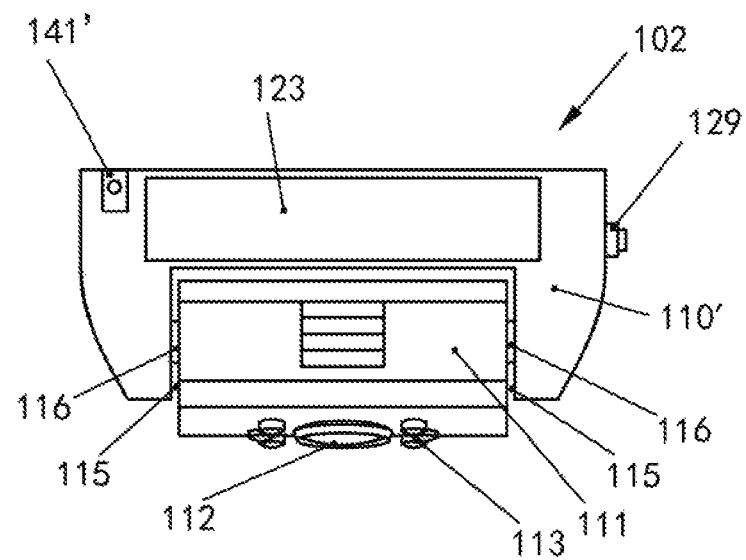
Figure 19:
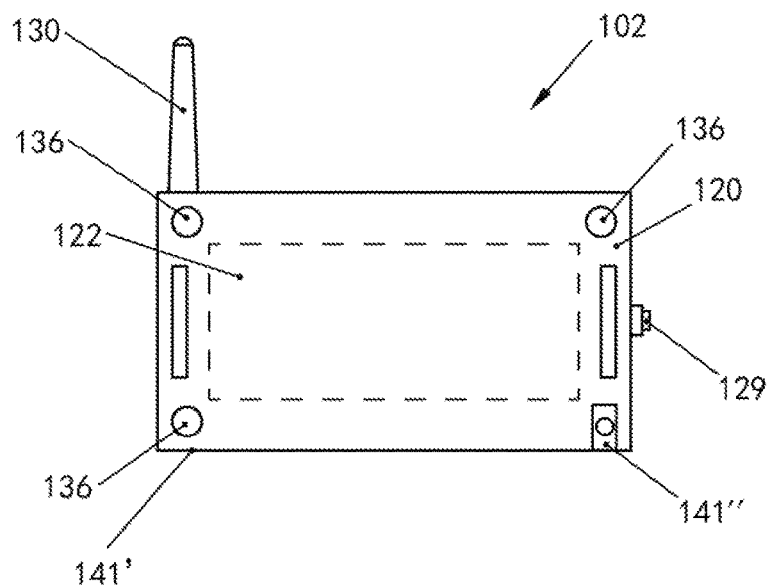

A provided battery bin 123 (a cover plate of the battery bin 123) and a socket 141' of the first power supply connection device 131 can be seen in FIG. 18. The battery bin 123 is provided in the camera base 110', and a rechargeable battery may be disposed in the battery bin 123. In FIG. 19, a reference numeral 136 denotes positioning recesses provided in a back surface 120 of the camera base 110' and coupled to the power supply connector 110, and the positioning recesses 136 are matchable with positioning projections 136' provided at the corresponding positions on an attachment surface 122' of the power supply connector 110. A reference numeral 141" denotes a socket of the second power supply connection device 132. The sockets 141' and 141" are located on the side of the camera base 110' and also connectable to a power supply including an internal power supply of the automobile. A reference numeral 122 indicates a magnet provided in the back surface 120 of a camera base section 102 (including the camera base 110'), and the back surface 120 is a flat surface conveniently attachable to the attachment surface 122' of the power supply connector 110 and conveniently attachable to any other surface having properties of an iron family metal (especially the surface outside the tail portion of the automobile).

Figure 20:
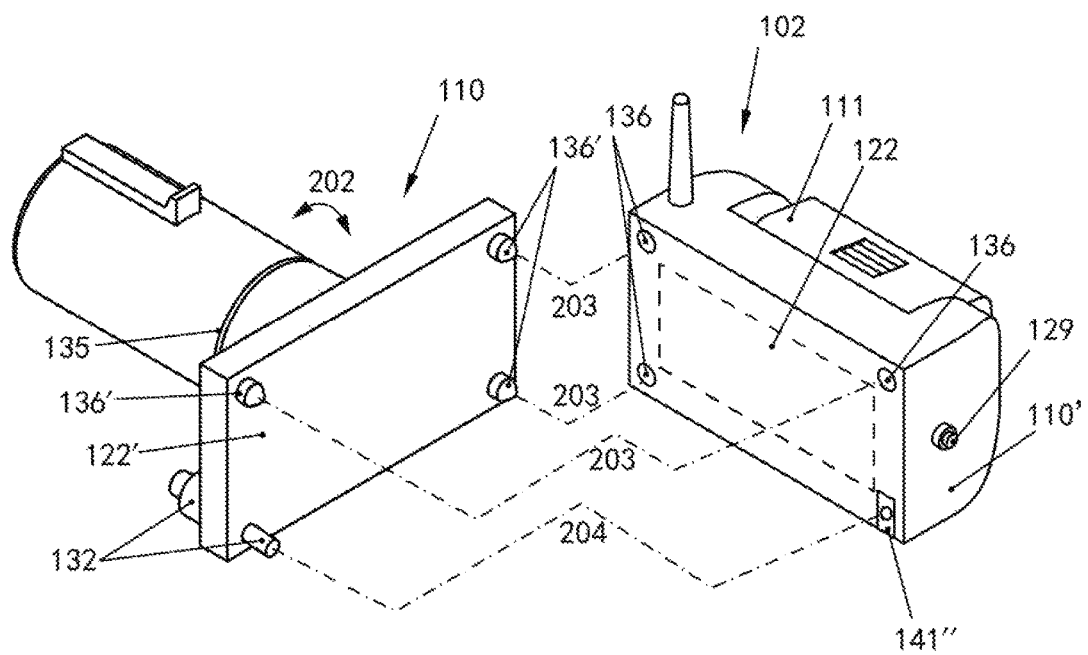

The power supply connector 110 on the left hand in FIG. 20 has the positioning projections 136' to be coupled to the positioning recesses 136 of the camera base section 102 and the attachment surface 122' to be attached to the back surface 120 of the camera base section 102, and provided with the second power supply connection device 132. When the camera base section 102 and the power supply connector 110 are joined, the positioning projections 136' are imbedded into the respective positioning recesses 136 as indicated by a dot-dash line 203, and the camera base section 102 and the power supply connector 110 are firmly attracted together since the magnet 122 comes in contact with the attachment surface 122' having properties of an iron family metal. At this time, the power supply connection device 132 may be pressed and inserted into the socket 141" as indicated by a dot-dash line 204, and then the camera device 101 is power-on (of course, the first power supply connection device 131 or any other power supply connection device may be used). The camera base section 102 and the power supply connector 110 can be separated by overcoming the magnetic force with hand.

Figure 21:
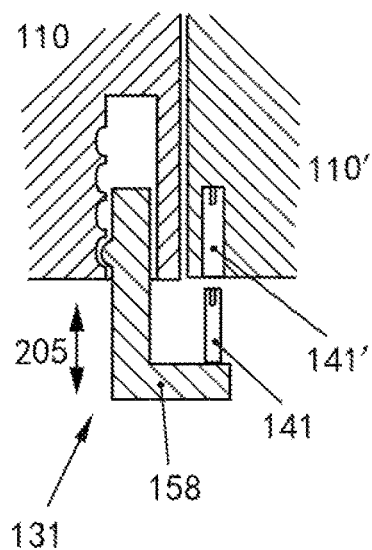

FIG. 21 is a schematic diagram of the first plug-socket device 131 by which the camera base section 102 and the power supply connector 110 are electrically communicable with each other. The plug-socket device 131 includes a plug 141 and the socket 141', wherein the plug 141 is provided on a bent portion of an L-shaped push-pull rod 158, the push-pull rod 158 is slidable along a slide way in the power supply connector 110, and the socket 141' is provided in the camera base 110'. The camera base 110' and the power supply connector 110 shown in FIG. 21 are attached together by virtue of a magnetic force, and they may be electrically connected by moving the push-pull rod 158 to insert the plug 141 into the socket 141' or may be electrically disconnected by drawing the plug 141 out as indicated by a double-headed arrow 205. Here, a direction in which the push-pull rod 158 is moved is parallel to an attachment plane between the camera base 110' and the power supply connector 110.

Figure 22:
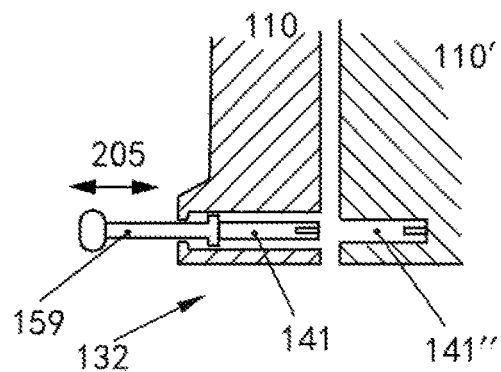

FIG. 22 is a schematic diagram of the second plug-socket device 132 by which the camera base section 102 and the power supply connector 110 are electrically communicable with each other. The plug-socket device 132 includes a plug 141 and the socket 141", wherein the plug 141 is provided on one end of a straight push-pull rod 159, the push-pull rod 159 is slidable along a slide way in the power supply connector 110, and the socket 141" is provided in the camera base 110'. The camera base 110' and the power supply connector 110 shown in FIG. 22 are attached together by virtue of a magnetic force, and they may be electrically connected by moving the push-pull rod 159 to insert the plug 141 into the socket 141" or may be electrically disconnected by drawing the plug 141 out as indicated by a double-headed arrow 205. Here, a direction in which the push-pull rod 159 is moved is perpendicular to an attachment plane between the camera base 110' and the power supply connector 110.

Figure 23:
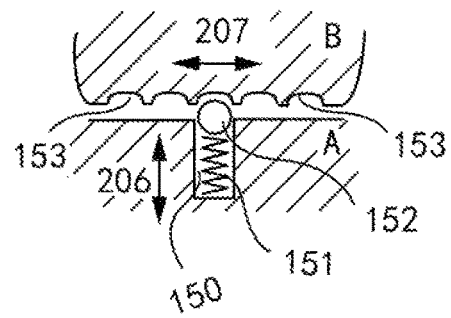

In FIG. 23, a rotational position fixing device for fixing an adjustable rotation angle is used in the pivot-bearing device provided in the junction 135 of the two segments into which the rear extension portion of the power supply connector 110 is divided or used in the pivot-bearing devices 116 provided between the camera base 110' and the camera case 111. As shown in FIG. 23, one part A of two parts rotated relatively to each other is provided with a hollow 150, a bead 152, and a spring 151, and the other part B is provided with cavities 153. The spring 151 is bounced as indicated by a double-headed arrow 206, while the part B is rotated or moved as indicated by a double-headed arrow 207 and fixed.

Figure 24:
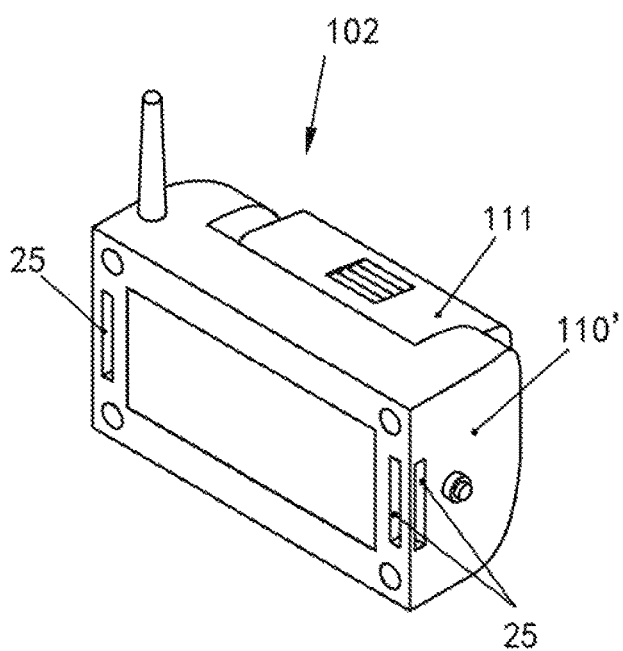
FIG. 24 is a schematic diagram of slots to be passed through by a binding tape of the camera base.

As shown in FIG. 24, in a case where neither the power supply connector 110 nor the magnet is used to fix the camera base section 102, the camera base section 102 may be fixed in any position with a pair of slots 25 using a binding tape.

Figure 25:
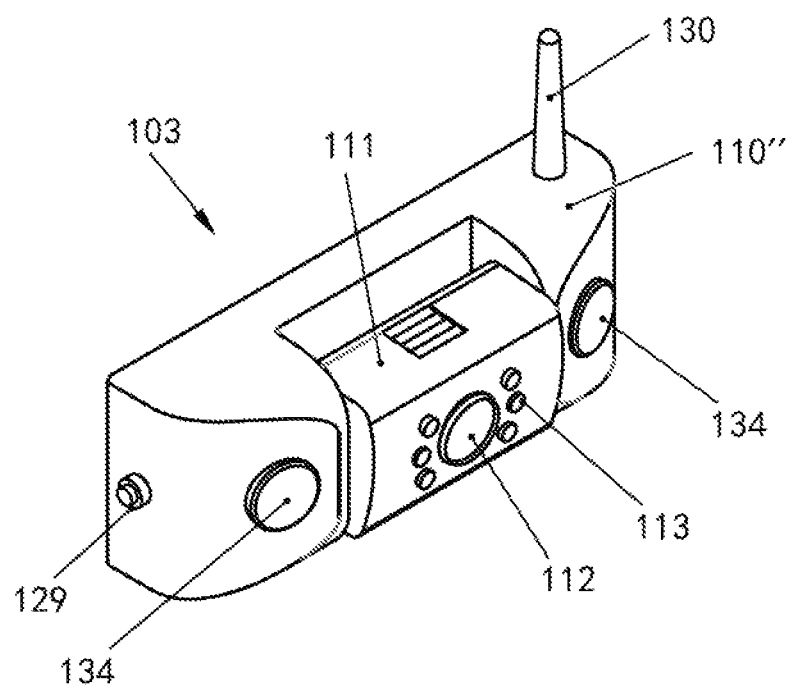
FIG. 25 is a schematic diagram of additional ultrasonic range-sensing alarming probes of the camera base.

As shown in FIG. 25, a pair of ultrasonic range-sensing alarming probes 134 are additionally provided on a camera base section 103. The ultrasonic range-sensing alarming probes 134 are provided on a camera base 110" and located on both sides of the camera case 111. The ultrasonic range-sensing alarming probes 134 function to issue an alarming signal (a sound, lights, etc.) at a preset safe distance for obstacles in case of reversing or parking so that safety is improved further.

The camera device according to the embodiment B-1 of the present invention is used with high adaptability: (1) the camera base section may be inserted into the power supply socket outside the tail portion of the automobile through the power supply connector, and the camera base section may be supplied with power while being fixed; (2) the camera base section may be used individually and fixed in any position outside the automobile by use of the magnet in the back portion of the camera base section, and any power supply may be used to charge the battery; and (3) the camera base section may be used individually and fixed in any position with the slots in the back portion of the camera base section using the binding tape.

An implementation C of the present invention will be described below with reference to FIGS. 28-32.

Figure 26:
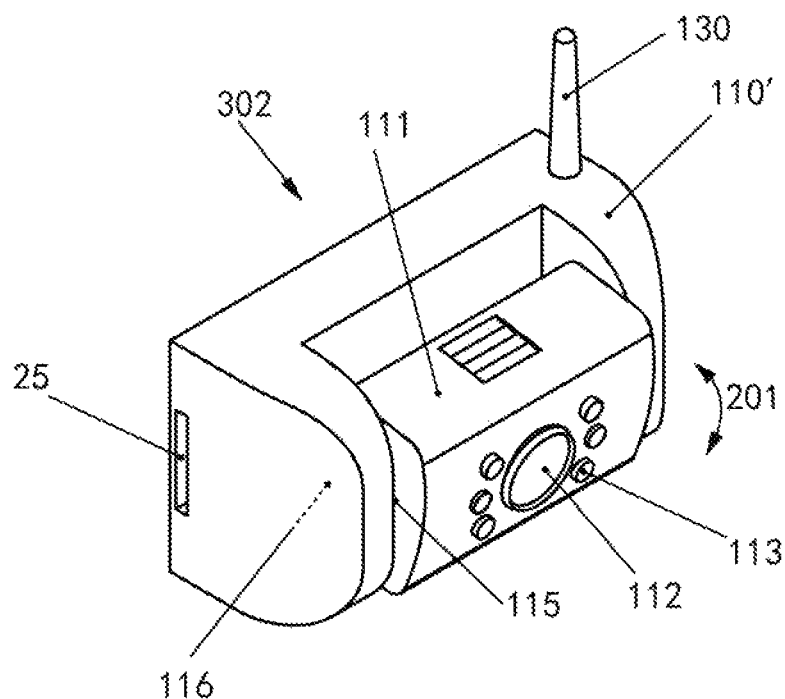
FIGS. 26 and 27 are a right front view in the depression direction and a rear view of a camera section according to the present invention respectively.

As shown in FIG. 26, a camera section 302 includes a camera base 110' and a camera case 111. The camera base 110' is provided with an antenna 130 which transmits a wireless pickup signal to a display screen device within an automobile. The camera case 111 has a pickup lens 112 housed therein and 2~12 (6 in FIG. 26) semiconductor auxiliary light sources 113 provided around the pickup lens 112 in the camera case 111, and the semiconductor auxiliary light sources 113 are used to offer auxiliary illumination for the pickup lens 112 in the dark. The camera base 110' and the camera case 111 are sized such that the camera case 111 is able to be exactly held in a U-shaped space of the camera base 110' with a slight gap 115 left therebetween. Additionally, pivot-bearing devices 116 by which the camera case 111 is rotatable with respect to the camera base 110' by a certain angle (that is, changeable by a depression angle or an elevation angle) in the U-shaped space (as indicated by a double-headed arched arrow 201) are respectively provided to the camera base 110' and the camera case 111 so that the pickup lens 112 aims at an object to be picked up. The pivot-bearing devices 116 may have any commonly used structure, each of the pivot-bearing devices 116 having an elevation angle ranging in 30°~60° and a depression angle ranging in 15°~30° as a rotatable angle, and rotational position fixing devices in a form of bead and cavity are provided in two adjacent surfaces rotated relatively to each other, each of the rotational position fixing devices having 4~12 fixable stop positions. Slots 25 to be passed through by a binding tape are provided on left and right ends of a back portion of the camera base 110', and the camera section 302 may be fixed using the binding tape.

Figure 27:
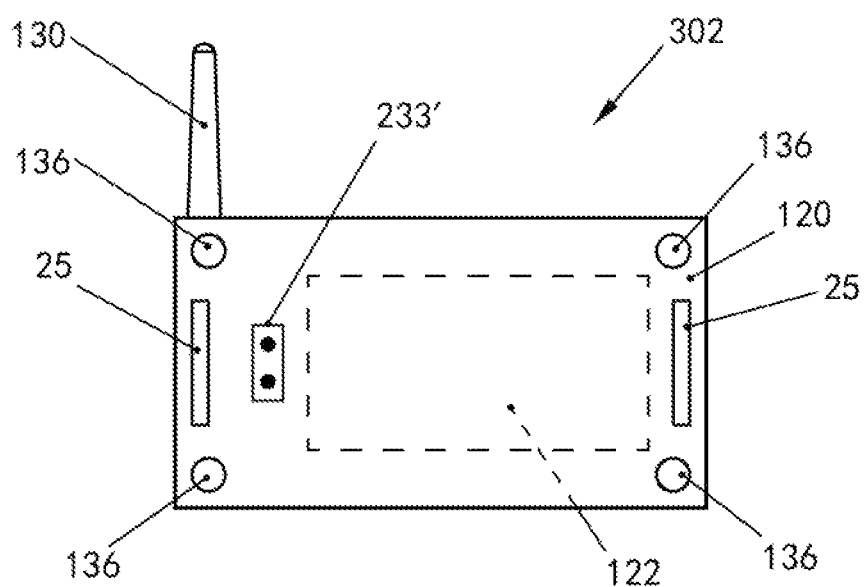

In FIG. 27, a reference numeral 136 denotes positioning recesses coupled to an attaching device, and the positioning recesses 136 are matchable with positioning projections 136' provided at the corresponding positions on a magnetic attraction box of the attaching device. A reference numeral 122 indicates a magnet provided in a back surface 120 of the camera base 110', and the back surface 120 is a flat surface conveniently attachable to an attachment surface 222' of the magnetic attraction box of the attaching device. A reference numeral 233' indicates an electrical socket of a plug-socket device, and electricity is introduced into the electrical socket 233' of the camera base 110' from an electrical plug 233 of the magnetic attraction box of the attaching device to supply power for image picking up and signal transmission.

FIG. 28 is a right front view in a depression direction of an attaching device 270 including a magnetic attraction box 260 according to the implementation C of the present invention, FIG. 29 is a right rear view in an elevation direction of the attaching device 270, and FIG. 30 is a right side view of the attaching device 270. The attachment surface 222' in the front of the magnetic attraction box 260 is attachable to the back surface 120 of the camera base 110'. The positioning projections 136' matchable with the positioning recessed 136 provided in the back surface 120 of the camera base 110' are provided at four corners of the attachment surface 222' (the number of the positioning projections 136' is at least two). Electricity is introduced to the electrical socket 233' provided in the back surface 120 of the camera base 110' by the electrical plug 233 to supply power for image picking up and signal transmission. A reference numeral 267 denotes a conducting wire by which the magnetic attraction box 260 is connected to a power supply, and the power supply is preferably led out in parallel with a tail lamp controlled by a reverse gear. A soft rubber waterproof seal ring 266 is provided on the attachment surface 222' of the magnetic attraction box 260, and when the back surface 120 of the camera base 110' is attached to the attachment surface 222' by virtue of a magnetic force, the seal ring 266 is compressed to be deformed by the back surface 120 and achieves a water proofing effect. Another waterproof seal ring (not shown in figures) may also be provided at the corresponding positions on the back surface 120 of the camera section 302 to improve the sealing effect.

A fixing device of the attaching device 270 is an L-shaped clamp plate 261, a short leaf of the clamp plate 261 is integrally connected to the magnetic attraction box 260, and a long leaf of the clamp plate 261 is located at the back of the magnetic attraction box 260 and is parallel to the magnetic attraction box 260. The long leaf of the clamp plate 261 is installed to a tail portion of the automobile and fastened between a license plate and a license plate holder so that the camera faces rearward of the automobile purposely. For firm attachment, a double-faced adhesive strip 264 is adhered to an inner surface of the long leaf of the clamp plate 261 to enhance clamping firmness. In addition, as indicated by a dot-dash line 405, a soft rubber waterproof cap 233" is provided for the electrical plug 233 protruding outward, and the electrical plug 233 can be covered with the waterproof cap 233" to prevent climate erosion when the camera is not used. Further, gold plating may be applied to electrical contacts of the plug-socket device to increase reliability.

Figure 31:
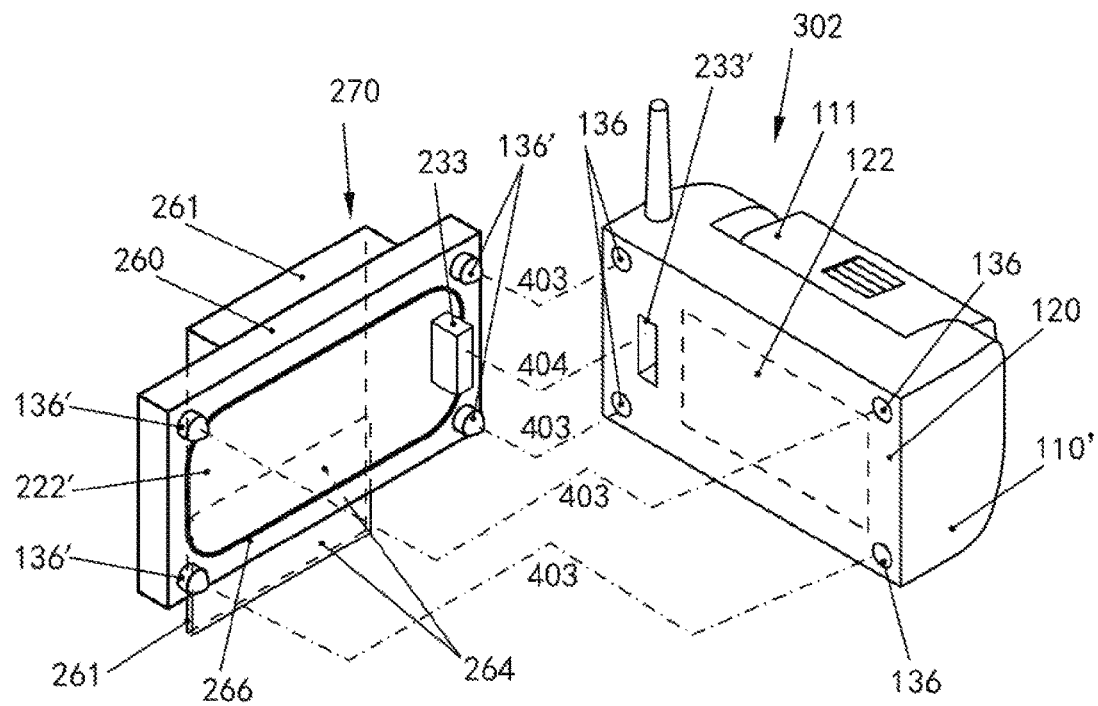

FIG. 31 shows how the magnetic attraction box 260 of the attaching device 270 shown in FIG. 28 is attached to a back portion of the camera section 302. The positioning projections 136' are imbedded into the positioning recesses 136 in a one-to-one correspondence as indicated by a dot-dash line 403, and the electrical plug 233 is inserted into the electrical socket 233' as indicated by a dot-dash line 404 to introduce electricity in. Meanwhile, the back surface 120 of the camera base 110' is pressed against the attachment surface 222' of the magnetic attraction box 260 so that the seal ring 266 is compressed to achieve a water proofing effect for protecting the plug-socket device.

Figure 32:
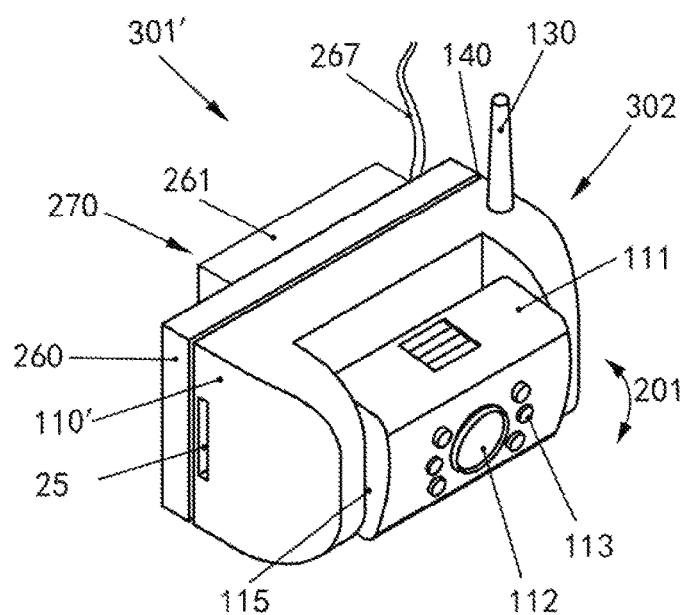

FIG. 32 shows that the attaching device 270 shown in FIG. 28 and the camera section 302 are attracted and attached together in the junction 140 and become an integral camera device 301', and the integral camera device 301' is attached to the license plate outside the tail portion of the automobile and is ready to be put into practical use.

An embodiment B-2 of the implementation B of the present invention will be described below with reference to FIGS. 33-37.

Figures 33, 34, 35:
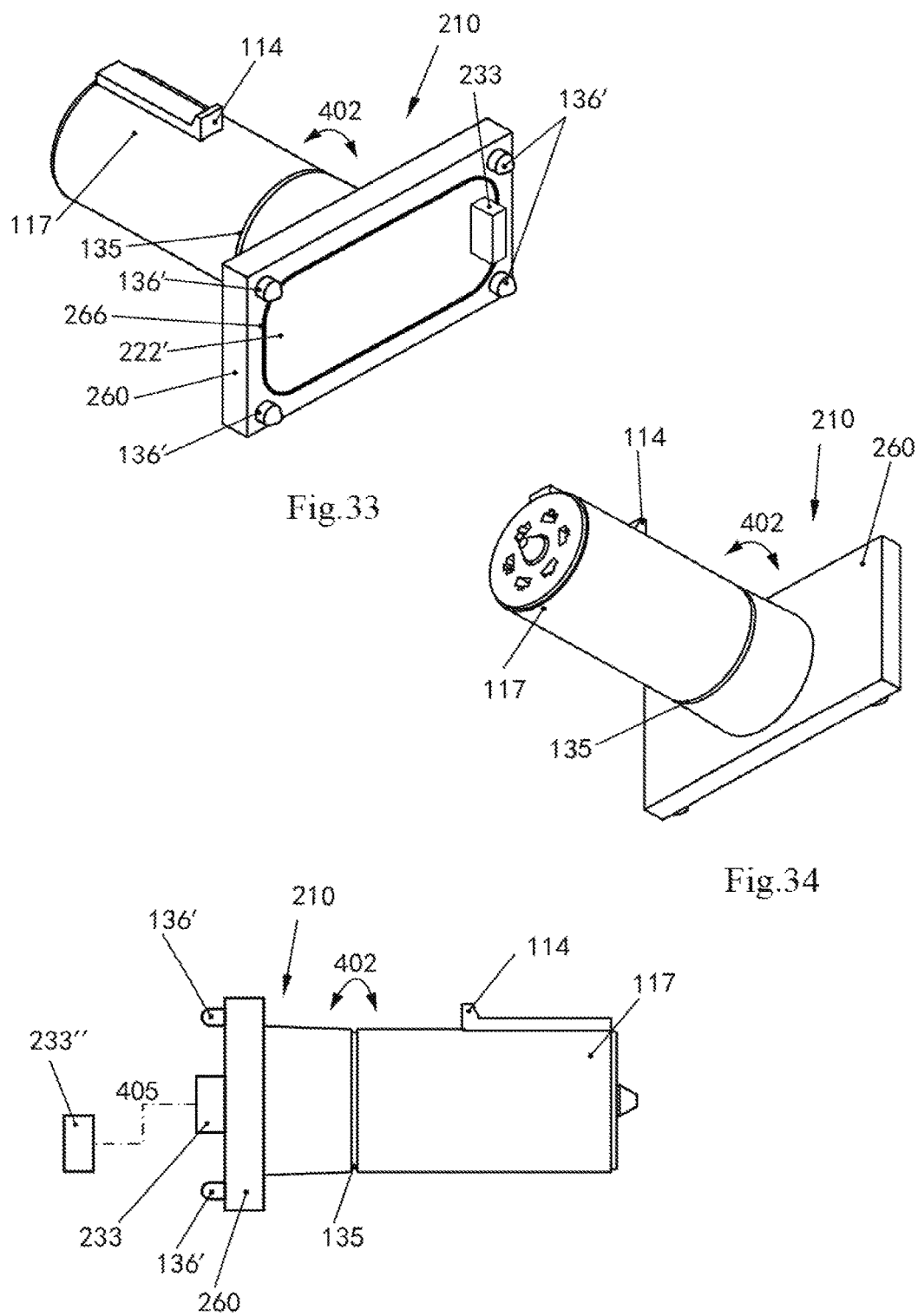
FIGS. 33-37 are isolated and assembled schematic diagrams of the camera section and the attaching device according to an embodiment B-2 of the present invention.

FIG. 33 is a right front view in a depression direction of an attaching device 210 including a magnetic attraction box 260, FIG. 34 is a right rear view in an elevation direction of the attaching device 210, and FIG. 35 is a left side view of the attaching device 210.

In the embodiment B-2, the magnetic attraction box 260 and the camera section 302 as well as a manner in which they are joined are similar to those described in connection with FIGS. 13-23 in the embodiment B-1 of the implementation B. The embodiment B-2 is different from the embodiment B-1 in the attaching device 210 shown in FIGS. 33-35. The attaching device 210 includes the magnetic attraction box 260 and a fixing device behind the magnetic attraction box 260. Here, the electrical plug 117 extending rearward from the magnetic attraction box 260 to be connected to a power supply is concurrently used as the fixing device. The electrical plug 117 has a structure matchable with an ordinary power supply socket outside a tail portion of an automobile (for example, a cross country vehicle, a pickup truck, a trailer, etc.). When the electrical plug 117 is inserted into the power supply socket outside the tail portion of the automobile, an integral camera device 301 is attached and fixed in an operating position while electricity is being introduced in. The power supply socket outside the tail portion of the automobile usually has a spring cover (not shown in figures), and when the electrical plug 117 is inserted into the power supply socket outside the tail portion of the automobile, the spring cover is firmly fastened and fixed on a clip 114 of the electrical plug 117 by virtue of a resilient force of the spring cover so that the integral camera device 301 does not drop off due to travelling vibration.

After the electrical plug 117 is inserted into the power supply socket outside the tail portion of the automobile to attach and fix the integral camera device 301 therein, a direction in which an image is to be picked up is not necessarily correct. Thus, the electrical plug 117 are divided into two segments, and a pivot-bearing device by which these two segments are rotated relatively to each other as indicated by a double-headed arched arrow 402 is provided in a junction 135 of the two segments so that the pickup lens 112 is directed correctly, the pivot-bearing device of the electrical plug 117 having a rotatable angle of about 360°. Meanwhile, a rotational position fixing device in a form of bead and cavity (refer to FIG. 23) is also provided in two adjacent surfaces rotated relatively to each other, and the rotational position fixing device has 12~24 fixable stop positions.

Figure 36:
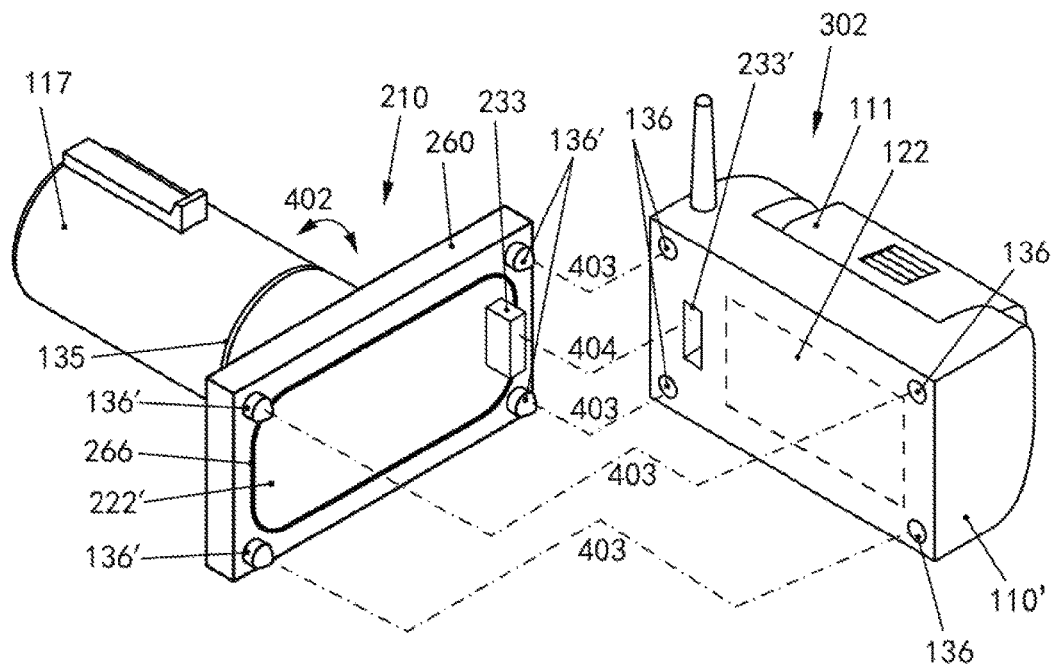

FIG. 36 shows how the magnetic attraction box 260 of the attaching device 210 shown in FIG. 33 is attached to a back portion of the camera section 302. The positioning projections 136' are imbedded into the positioning recesses 136 in a one-to-one correspondence as indicated by a dot-dash line 403, and the electrical plug 233 is inserted into the electrical socket 233' as indicated by a dot-dash line 404 to introduce electricity in. Meanwhile, a back surface 120 of the camera base 110' is pressed against an attachment surface 222' of the magnetic attraction box 260 so that a seal ring 266 is compressed to achieve a water proofing effect for protecting a plug-socket device.

Figure 37:
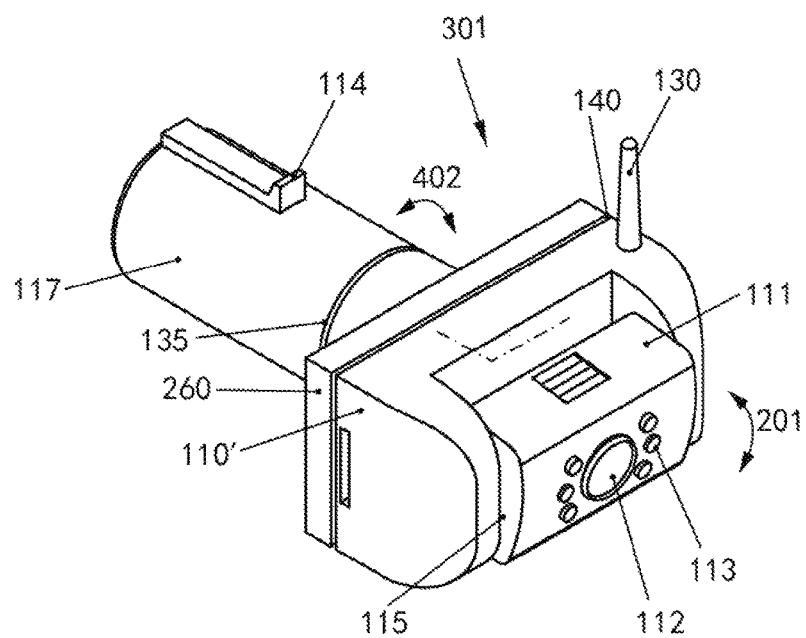

FIG. 37 shows that the attaching device 210 shown in FIG. 33 and the camera section 302 are attracted and attached together in the junction 140 and become the integral camera device 301, and the integral camera device 301 is attached to the power supply socket outside the tail portion of the automobile and is ready to be put into practical use.

An embodiment A-2 of the implementation A of the present invention will be described below with reference to FIGS. 38-42.

Figure 38:
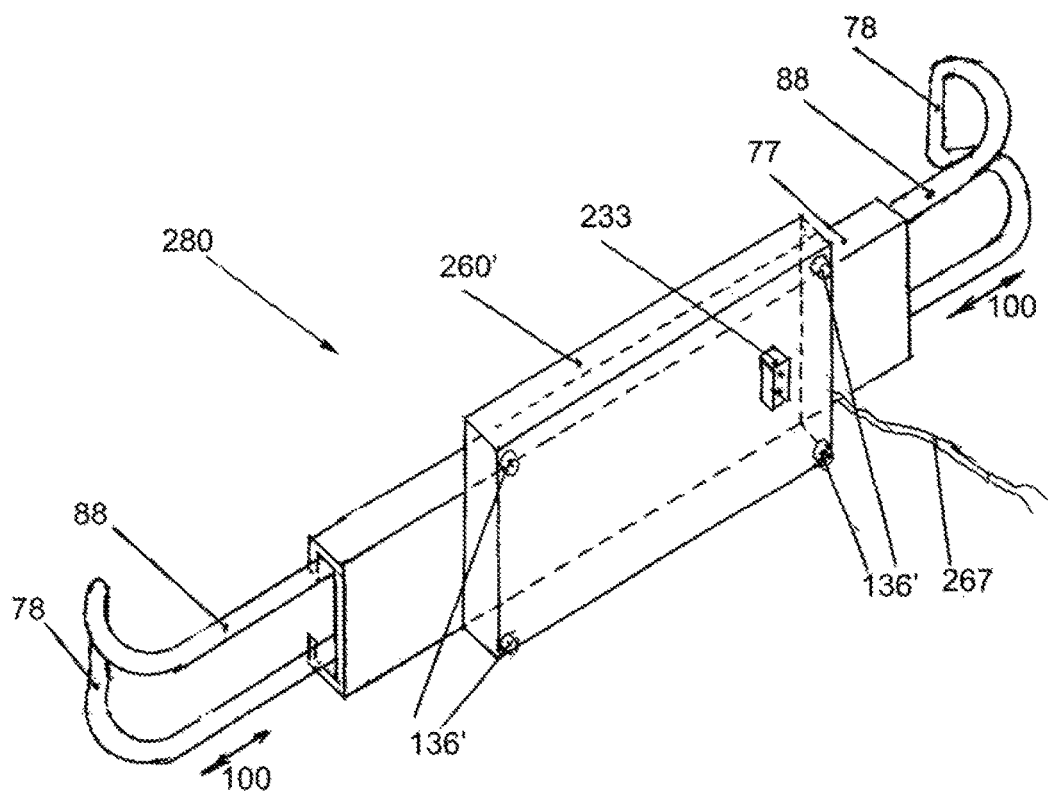
FIGS. 38-42 are isolated and assembled schematic diagrams of the camera section and the attaching device according to an embodiment A-2 of the present invention and a modification thereof.
Figure 39:
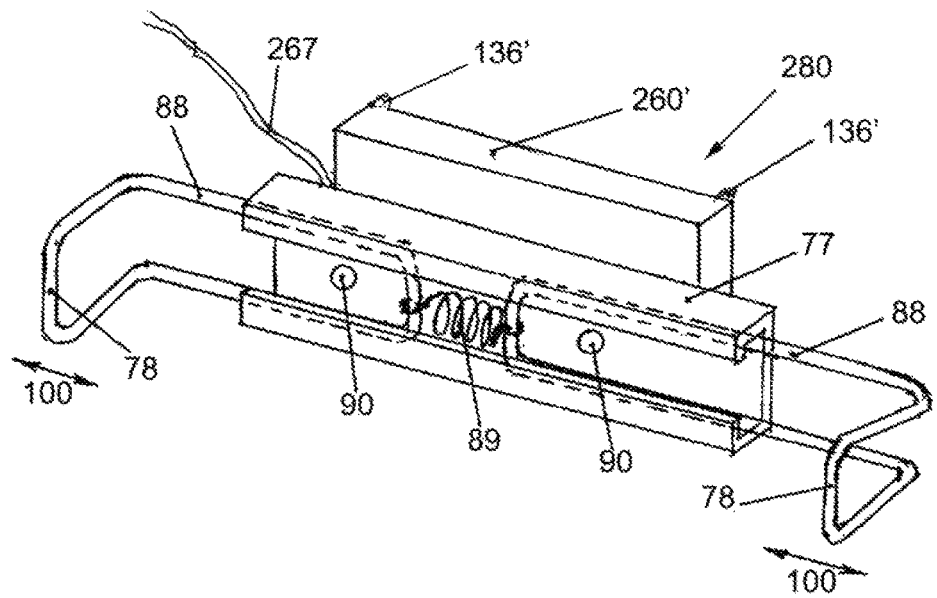

A camera device 301" is attached to a seat in an automobile in the embodiment A-2, which is especially suitable for a case in which an infant on a rear seat of the automobile is required to be taken care of. As shown in FIGS. 38 and 39, a back portion of a magnetic attraction box 260' is fixed to a grooved rail 77 with holes 90 by use of bolts. A pair of drag hooks 88 each of which is formed by two bars are provided in a groove of the grooved rail 77 with hooked ends 78 disposed externally of the groove. In the groove, tail ends of the two drag hooks 88 are connected together by a spring 89.

A headrest is provided above a backrest of the seat in the automobile. The headrest is fixed to the backrest of the seat through a pair of vertical shafts. The headrest is slightly lifted up to expose a fraction of the vertical shafts. The pair of drag hooks 88 in FIG. 38 or 39 are pulled outward as indicated by a double-headed arrow 100, the two hooked ends 78 are respectively caught by the pair of vertical shafts, and thus an attaching device 280 with the magnetic attraction box 260' is fixed therein by virtue of a resilient force of the spring 89.

Figure 40:
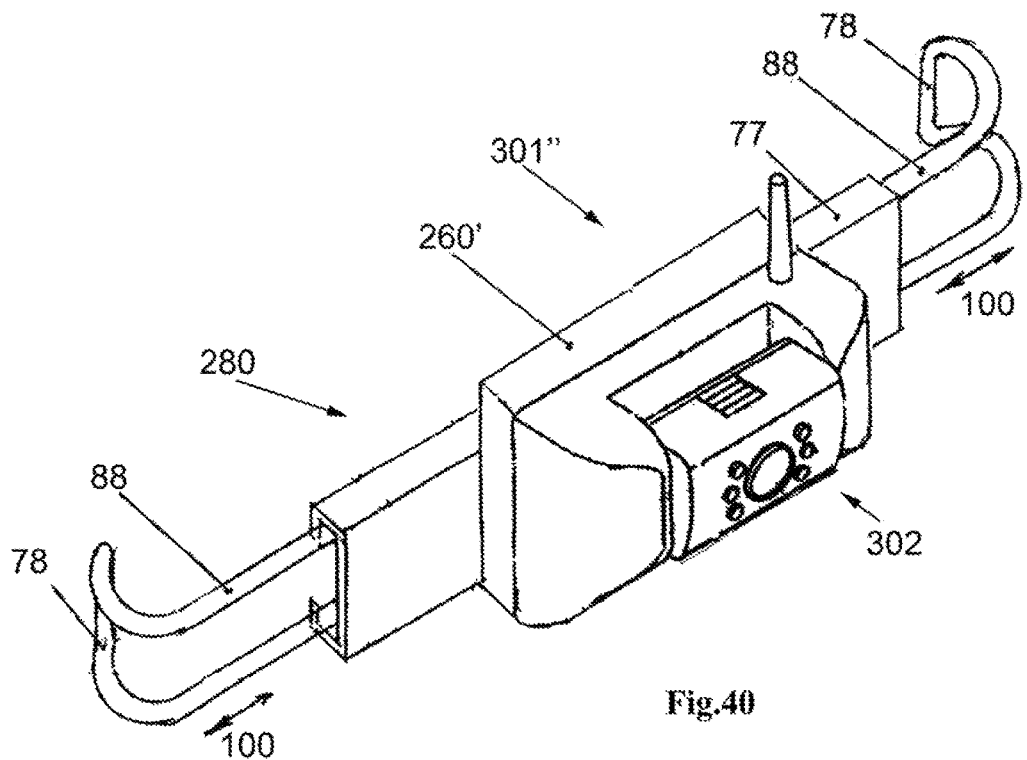

Similarly, it is also conceivable that the camera device 301" shown in FIG. 40 will be obtained if the camera section 302 on the right hand in FIG. 31 or 36 is attached to the attaching device 280 shown in FIG. 38.

Figure 41:
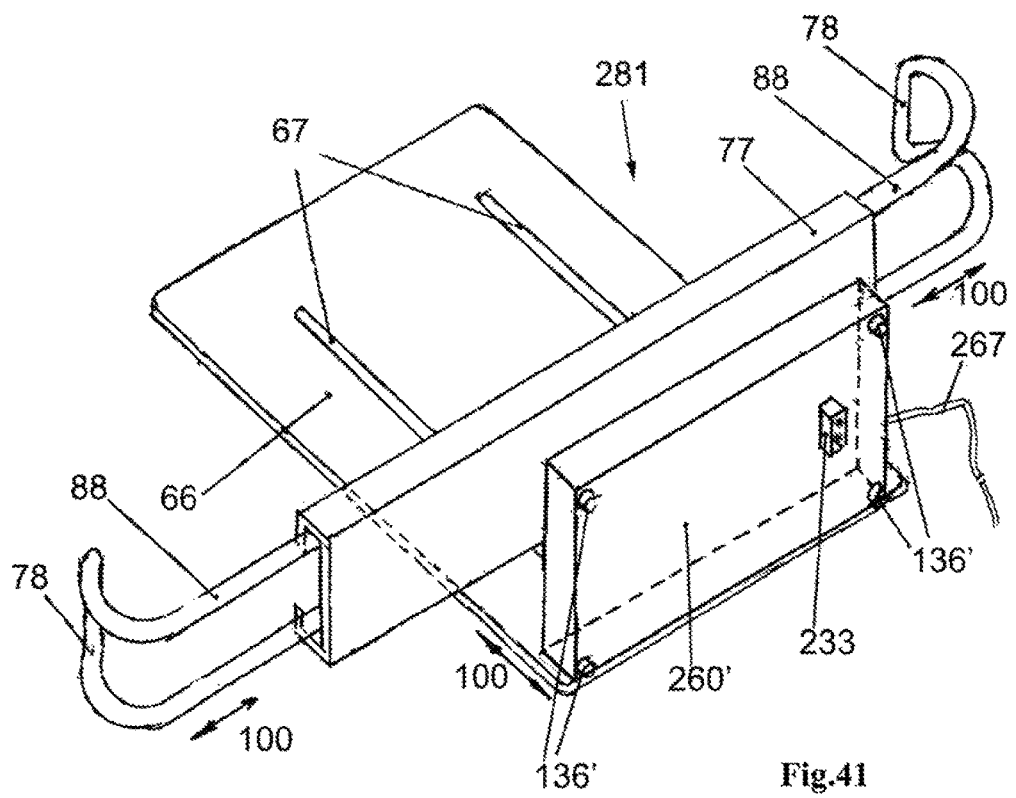
Figure 42:
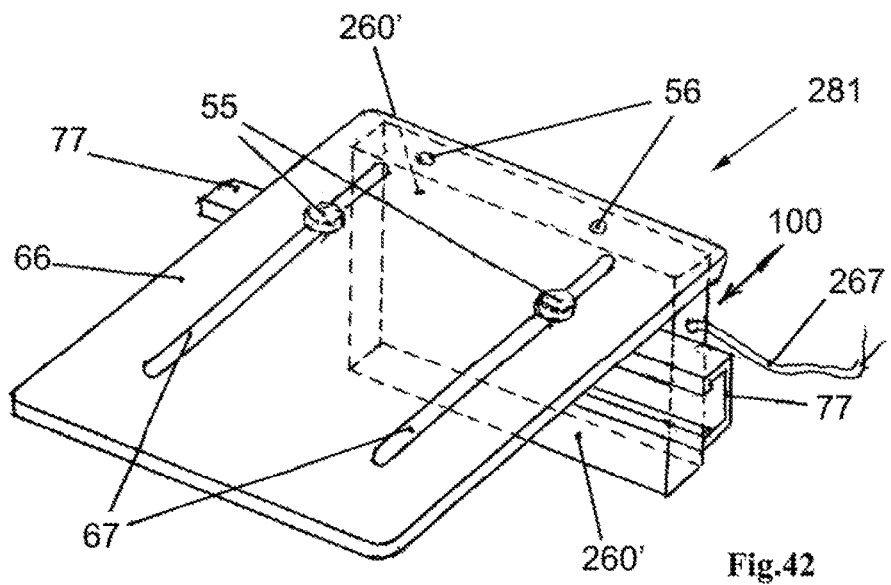

FIGS. 41 and 42 show an attaching device 281 according to a modification of the embodiment A-2. As seen from FIGS. 41 and 42, the magnetic attraction box 260' is fixed to a slidable bottom plate 66 with holes 56 by use of bolts instead of being attached to the grooved rail 77. The slidable bottom plate 66 has two slots 67 parallel to each other therein. The slidable bottom plate 66 is attached to the grooved rail 77 by stud bolts 55, but is not fastened so that the bottom plate 66 is maintained to be slidable. The slidable bottom plate 66 together with the magnetic attraction box 260' can change or adjust their front-rear positions along a direction indicated by the double-headed arrow 100 to control an appropriate picking up position, which is more adaptable.

Figure 43:
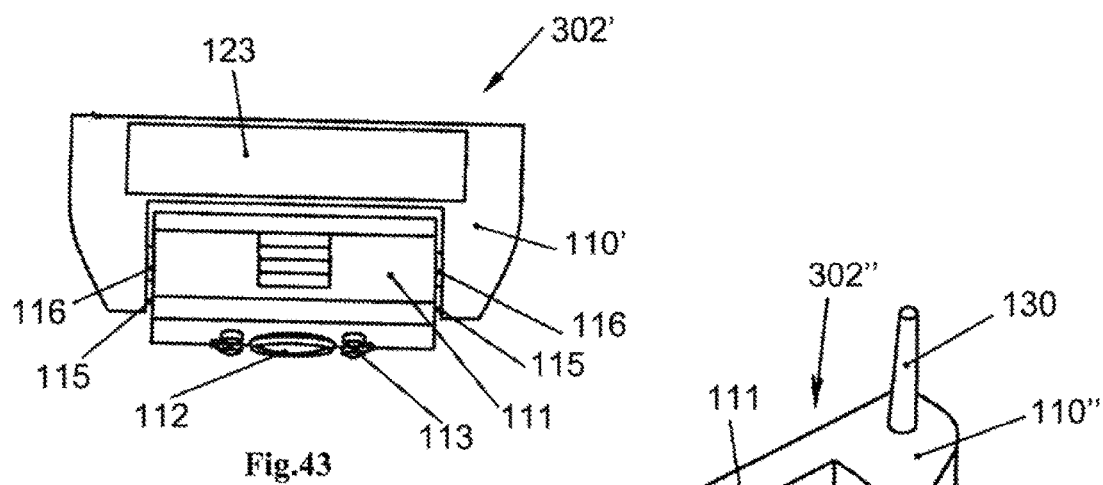
FIGS. 43 and 44 are schematic diagrams of other forms of the camera section according to the present invention.

FIG. 43 is a bottom view of a separate camera section 302' and shows another form of the above embodiments. A battery bin 123 in which a battery is disposed is additionally provided in the camera section 302' to offer an independent power supply. Thus, the camera section 302' may be attracted to any ferrous metal surface inside or outside the automobile instead of being attracted to the magnetic attraction box 260 or 260' like the above embodiments, and can be used in a larger range.

Figure 44:
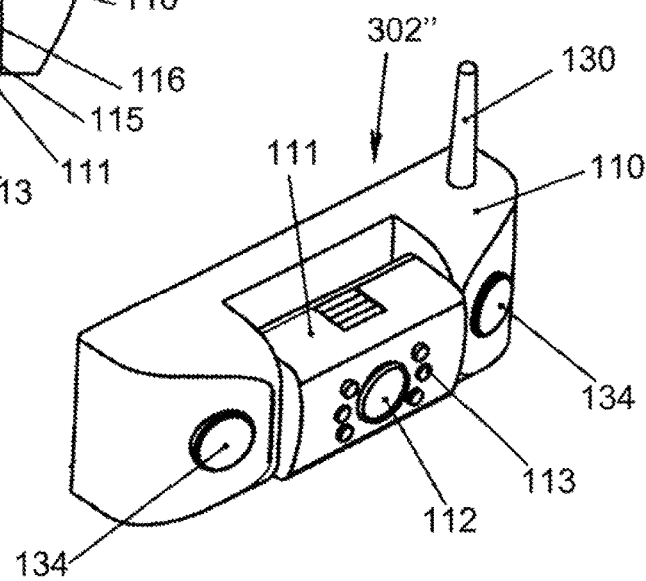

FIG. 44 is a right front view in a depression direction of a separate camera section 302" and shows still another form of the above embodiments. A pair of ultrasonic range-sensing alarming probes 134 are additionally provided on the camera section 302". The ultrasonic range-sensing alarming probes 134 are provided on a camera base 110" and located on both sides of the camera case 111. The ultrasonic range-sensing alarming probes 134 function to issue an alarming signal (a sound, lights, etc.) at a preset safe distance for obstacles in case of reversing, especially in case of reversing and parking, so that safety is improved further.

As shown in FIGS. 26 and 27, the pair of slots 25 to be passed through by the binding tape are opened on left and right ends of the back portion of the camera section 302. The camera section 302, 302' or 302" may be fixed to the vertical shafts of the headrest above the backrest of the seat in the automobile or may be located at other adequate positions inside or outside the automobile using the additionally provided binding tape.

The present invention may be modified into the following alternative forms (not shown in figures).

In a case where a magnet is not used for attraction, the camera section 302, 302' or 302" may be directly fixed to the magnetic attraction box 260 or 260' shown in FIGS. 28-42 (for example, by bolts). At this time, the magnetic attraction box becomes a fixing box (or a fixing plate, a fixing disk, a fixing sheet, etc.) since it has no magnetism.

In the embodiments mentioned above, the camera section can be operated as long as it is attached and attracted to the magnetic attraction box, which is very convenient. However, the camera section provided outside the automobile is likely to be stolen. It is also possible to add locking rings to the camera section and the fixed attaching device respectively and to lock them by a lock.

From FIGS. 41 and 42, in a case where the slidable bottom plate 66 has only one slot instead of the two parallel slots 67, the camera section 302 is not only movable in a front-rear direction but also inclinable along with the bottom plate 66 in a left-right direction, which is more adaptable.

It does not matter whether the positioning recesses 136 and the positioning projections 136' as well as the electrical plug 233 and the electrical socket 233' are provided to the surface in which a magnet is disposed or the attachment surface attracted by the magnet, as long as the two surfaces attracted by a magnetic force can be coupled to each other. However, it is preferable that the convex (the positioning projections 136' and the electrical plug 233) be provided on the attachment surface 222' of the magnetic attraction box 260, the concave (the positioning recesses 136 and the electrical socket 233') be provided in the back surface 120 of the camera base 110', and the magnet 122 be provided in the back surface 120. In this way, the following advantages can be achieved: since the back surface 120 of the camera base 110' is simply flat and has a magnetic attraction force, in a case where the battery bin 123 in which a battery is disposed is additionally provided in the camera section 302', the camera section can supply power for itself and be used independently. The camera section is facilitated to be attached, attracted and fixed to any other surface having properties of an iron family metal inside or outside the automobile, that is, there are a lot of attachment positions to cause great adaptability.

Moreover, although the magnetic attraction box 260 or 260' is generally made into a flat box, other shapes such as a disk shape and a sheet shape are also possible, as long as requirements based on a basic concept of the present invention are satisfied.

What is claimed is:

1. A camera device, comprising:
a camera section which includes a camera base and a camera case disposed on the camera base and housing a pickup lens therein; and
an attaching device which includes a magnetic attraction box and a fixing device formed integrally with the magnetic attraction box and fixable to an automobile,
wherein a wireless transmitter which transmits an image signal picked up by the pickup lens to a receiver within the automobile in a wireless manner is provided in the camera base, a front surface of the magnetic attraction box is an attachment surface attachable to and matchable with a back surface of the camera base, one of the front surface and the back surface is provided with a magnet capable of attracting an iron family metal and the other of the front surface and the back surface has properties of an iron family metal attractable by the magnet, at least two positioning recesses are provided in the one of the front surface and the back surface and positioning projections matchable with the positioning recesses are provided on the other of the front surface and the back surface, number of the positioning projections is equal to number of the positioning recesses, electricity is introduced by the magnetic attraction box from an electrical system of the automobile into the camera base through a plug-socket device to supply power for image picking up and signal transmission,
wherein the fixing device formed integrally with the magnetic attraction box and fixable to the automobile is a fixing device having a grooved rail, double bar drag hooks and a spring, the magnetic attraction box is formed integrally with the grooved rail, and the fixing device is fixable to vertical shafts of a headrest of a seat in the automobile and
wherein a U-shaped space is formed in the camera base, a distance between two arms of the camera base is slightly larger than a length of the camera case so that the camera case is exactly held in the U-shaped space, pivot-bearing structures by which the camera case is rotated with respect to the camera base by an elevation angle or a depression angle are respectively provided at locations where both ends of the camera case are in contact with the two arms of the camera base and held by them, each of the pivot-bearing structures having an elevation angle of about 30° to about 60° and a depression angle of about 15° to about 30° as a rotatable angle, and rotational position fixing devices in a form of bead and cavity are provided in two adjacent surfaces rotated relatively to each other, each of the rotational position fixing devices having about 4 to about 12 fixable positions.

2. The camera device according to claim 1, wherein the back surface of the camera base is provided with a magnet capable of attracting an iron family metal and the front surface of the magnetic attraction box has properties of an iron family metal attractable by the magnet, at least two positioning recesses are provided in the back surface of the camera base and positioning projections matchable with the positioning recesses the number of which is equal to that of the positioning recesses are provided on the front surface of the magnetic attraction box, electricity from the electrical system of the automobile is introduced by the magnetic attraction box into a socket in the back surface of the camera base from a plug on the front surface of the magnetic attraction box through the plug-socket device to supply power for image picking up and signal transmission.

3. The camera device according to claim 1, wherein the fixing device having the grooved rail, the double bar drag hooks and the spring further has a slidable bottom plate capable of moving the magnetic attraction box, the magnetic attraction box is formed integrally with the bottom plate, and the fixing device is fixable to the vertical shafts of the headrest of the seat in the automobile.

4. The camera device according to claim 1, wherein slots to be passed through by a binding tape are provided on left and right ends of a back portion of the camera base.

5. A camera device, comprising:
a camera section which includes a camera base and a camera case disposed on the camera base and housing a pickup lens therein; and
an attaching device which includes a magnetic attraction box and a fixing device formed integrally with the magnetic attraction box and fixable to an automobile,
wherein a wireless transmitter which transmits an image signal picked up by the pickup lens to a receiver within the automobile in a wireless manner is provided in the camera base, a front surface of the magnetic attraction box is an attachment surface attachable to and matchable with a back surface of the camera base, one of the front surface and the back surface is provided with a magnet capable of attracting an iron family metal and the other of the front surface and the back surface has properties of an iron family metal attractable by the magnet, at least two positioning recesses are provided in the one of the front surface and the back surface and positioning projections matchable with the positioning recesses are provided on the other of the front surface and the back surface, number of the positioning projections is equal to number of the positioning recesses, electricity is introduced by the magnetic attraction box from an electrical system of the automobile into the camera base through a plug-socket device to supply power for image picking up and signal transmission, and
wherein the fixing device formed integrally with the magnetic attraction box and fixable to the automobile is a power supply connector, one end of the power supply connector is formed integrally with the magnetic attraction box by being connected to a back surface of the magnetic attraction box, the other end of the power supply connector is an electrical plug matchable with a power supply socket outside a tail portion of the automobile, and
wherein a U-shaped space is formed in the camera base, a distance between two arms of the camera base is slightly larger than a length of the camera case so that the camera case is exactly held in the U-shaped space, pivot-bearing structures by which the camera case is rotated with respect to the camera base by an elevation angle or a depression angle are respectively provided at locations where both ends of the camera case are in contact with the two arms of the camera base and held by them, each of the pivot-bearing structures having an elevation angle of about 30° to about 60° and a depression angle of about 15° to about 30° as a rotatable angle, and rotational position fixing devices in a form of bead and cavity are provided in two adjacent surfaces rotated relatively to each other, each of the rotational position fixing devices having about 4 to about 12 fixable positions.

6. The camera device according to claim 5, wherein the back surface of the camera base is provided with a magnet capable of attracting an iron family metal and the front surface of the magnetic attraction box has properties of an iron family metal attractable by the magnet, at least two positioning recesses are provided in the back surface of the camera base and positioning projections matchable with the positioning recesses the number of which is equal to that of the positioning recesses are provided on the front surface of the magnetic attraction box, electricity from the electrical system of the automobile is introduced by the magnetic attraction box into a socket in the back surface of the camera base from a plug on the front surface of the magnetic attraction box through the plug-socket device to supply power for image picking up and signal transmission, and
wherein a clip matchable with a spring cover of the power supply socket outside the tail portion of the automobile is provided on the power supply connector, a pivot-bearing structure by which either end of the power supply connector is rotated around a concentric longitudinal axis of the power supply connector by a left inclination angle or a right inclination angle is provided between both ends of the power supply connector, the pivot-bearing structure of the power supply connector having a rotatable angle of about 360°, and a rotational position fixing device in a form of bead and cavity is provided in two adjacent surfaces rotated relatively to each other, the rotational position fixing device having about 12° to about 24° fixable positions.

7. The camera device according to claim 5, wherein the camera base, the camera case, the magnetic attraction box, and the power supply connector are made to be water proof, air tight, and moisture resistant.

8. The camera device according to claim 5, wherein a soft rubber waterproof seal ring is provided for one or both of the front surface of the magnetic attraction box and the back surface of the camera base, and a soft rubber waterproof cap is provided for a plug on the front surface of the magnetic attraction box.

9. The camera device according to claim 5, wherein a battery bin for supplying power in which a battery is disposed is further provided in the camera base.

10. The camera device according to claim 5, wherein about 2 to about 12 semiconductor auxiliary light sources are provided around the pickup lens in the camera case.

11. The camera device according to claim 5, wherein a pair of ultrasonic range-sensing alarming probes are provided on the camera base and located on both sides of the camera case.

12. A camera device, comprising:
a camera section which includes a camera base and a camera case disposed on the camera base and housing a pickup lens therein; and
an attaching device which includes a magnetic attraction box and a fixing device formed integrally with the magnetic attraction box and fixable to an automobile, wherein a wireless transmitter which transmits an image signal picked up by the pickup lens to a receiver within the automobile in a wireless manner is provided in the camera base, a front surface of the magnetic attraction box is an attachment surface attachable to and matchable with a back surface of the camera base, one of the front surface and the back surface is provided with a magnet capable of attracting an iron family metal and the other of the front surface and the back surface has properties of an iron family metal attractable by the magnet, at least two positioning recesses are provided in the one of the front surface and the back surface and positioning projections matchable with the positioning recesses are provided on the other of the front surface and the back surface, number of the positioning projections is equal to number of the positioning recesses, electricity is introduced by the magnetic attraction box from an electrical system of the automobile into the camera base through a plug-socket device to supply power for image picking up and signal transmission, and wherein the fixing device formed integrally with the magnetic attraction box and fixable to the automobile is a clamp plate fastened and fixed to a license plate outside a tail portion of the automobile, and wherein a U-shaped space is formed in the camera base, a distance between two arms of the camera base is slightly larger than a length of the camera case so that the camera case is exactly held in the U-shaped space, pivot-bearing structures by which the camera case is rotated with respect to the camera base by an elevation angle or a depression angle are respectively provided at locations where both ends of the camera case are in contact with the two arms of the camera base and held by them, each of the pivot-bearing structures having an elevation angle of about 30° to about 60° and a depression angle of about 15° to about 30° as a rotatable angle, and rotational position fixing devices in a form of bead and cavity are provided in two adjacent surfaces rotated relatively to each other, each of the rotational position fixing devices having about 4 to about 12 fixable positions.

13. The camera device according to claim 12, wherein the back surface of the camera base is provided with a magnet capable of attracting an iron family metal and the front surface of the magnetic attraction box has properties of an iron family metal attractable by the magnet, at least two positioning recesses are provided in the back surface of the camera base and positioning projections matchable with the positioning recesses the number of which is equal to that of the positioning recesses are provided on the front surface of the magnetic attraction box, electricity from the electrical system of the automobile is introduced by the magnetic attraction box into a socket in the back surface of the camera base from a plug on the front surface of the magnetic attraction box through the plug-socket device to supply power for image picking up and signal transmission, and a double-faced adhesive strip is adhered to the clamp plate to enhance clamping firmness.

14. The camera device according to claim 12, wherein the camera base, the camera case, and the magnetic attraction box are made to be water proof, air tight, and moisture resistant.

15. The camera device according to claim 12, wherein a soft rubber waterproof seal ring is provided for one or both of the front surface of the magnetic attraction box and the back surface of the camera base, and a soft rubber waterproof cap is provided for a plug on the front surface of the magnetic attraction box.

16. The camera device according to claim 12, wherein a battery bin for supplying power in which a battery is disposed is further provided in the camera base.

17. The camera device according to claim 12, wherein about 2 to about 12 semiconductor auxiliary light sources are provided around the pickup lens in the camera case.

18. The camera device according to claim 12, wherein a pair of ultrasonic range-sensing alarming probes are provided on the camera base and located on both sides of the camera case.

* * * * *